United States Patent [19]

Inaba et al.

[11] Patent Number: 5,489,466
[45] Date of Patent: Feb. 6, 1996

[54] MAGNETIC RECORDING MEDIUM COMPRISING A LOWER NONMAGNETIC LAYER CONTAINING A SURFACE COATED INORGANIC POWDER AND AN UPPER MAGETIC LAYER

[75] Inventors: Hiroo Inaba; Kiyoma Ejiri; Kouichi Masaki; Takeshi Harasawa, all of Kanagawa, Japan

[73] Assignee: Fuji Photo Film Co., Ltd., Kanagawa, Japan

[21] Appl. No.: 272,871

[22] Filed: Jul. 8, 1994

Related U.S. Application Data

[63] Continuation of Ser. No. 1,659, Jan. 7, 1993, abandoned.

[30] Foreign Application Priority Data

| Jan. 8, 1992 | [JP] | Japan | 4-018419 |
| Jan. 8, 1992 | [JP] | Japan | 4-018420 |

[51] Int. Cl.$^6$ ..................................... G11B 5/00
[52] U.S. Cl. .................. 428/212; 428/323; 428/336; 428/404; 428/405; 428/694 BS; 428/694 BG; 428/694 BN; 428/900
[58] Field of Search ...................... 428/323, 336, 428/404, 405, 694 BS, 694 BG, 900, 212, 694 BN

[56] References Cited

U.S. PATENT DOCUMENTS

| 4,447,270 | 5/1984 | Howard et al. | 106/300 |
| 4,452,830 | 6/1984 | Yoshizumi | 427/215 |
| 4,528,240 | 7/1985 | Miyoshi et al. | 428/323 |
| 4,587,157 | 5/1986 | Brock et al. | 428/216 |
| 4,666,769 | 5/1987 | Miyata et al. | 428/323 |
| 4,746,558 | 5/1988 | Shimozawa et al. | 428/141 |
| 4,839,225 | 6/1989 | Matsufuji et al. | 428/336 |
| 4,863,793 | 9/1989 | Ogawa et al. | 428/323 |
| 4,874,633 | 10/1989 | Komatsu et al. | 427/48 |
| 4,943,479 | 7/1990 | Yamada et al. | 428/331 |
| 4,963,433 | 10/1990 | Ogawa et al. | 428/323 |
| 5,258,223 | 11/1993 | Inaba et al. | 428/323 |

*Primary Examiner*—Stevan A. Resan
*Attorney, Agent, or Firm*—Sughrue, Mion, Zinn, Macpeak & Seas

[57] ABSTRACT

Disclosed is a magnetic recording medium comprising a nonmagnetic support, a lower nonmagnetic layer and an upper magnetic layer. The lower nonmagnetic layer is coated on the support, comprises an inorganic nonmagnetic powder dispersed in a binder, and is surface-coated with an inorganic oxide. The upper magnetic layer has a dry thickness of 1.0 micrometers or less and comprises a dispersion of a ferromagnetic powder in a binder. The upper magnetic layer is coated onto the lower nonmagnetic layer.

14 Claims, No Drawings

MAGNETIC RECORDING MEDIUM
COMPRISING A LOWER NONMAGNETIC
LAYER CONTAINING A SURFACE COATED
INORGANIC POWDER AND AN UPPER
MAGETIC LAYER

This is a Continuation of application Ser. No. 08/001,659 filed on Jan. 7, 1993 now abandoned.

FIELD OF THE INVENTION

The present invention relates to a magnetic recording medium, and in particular to a magnetic recording medium comprising a magnetic layer having a thickness of 1.0 μm or less. More particularly, the present invention relates to a high density coating-type magnetic recording medium.

BACKGROUND OF THE INVENTION

Magnetic recording media are widely used as recording tape, video tape, computer tape, disc, etc. The recording density of magnetic recording media has become higher and higher, and the recording wavelength has become shorter and shorter every year. An analog system and digital system have been studied as the recording system for such magnetic recording media. In order to meet the high density requirement, a magnetic recording medium comprising a thin metal film as a magnetic layer has been proposed. A so-called coating-type magnetic recording medium comprising a magnetic layer that dispersed of a ferromagnetic powder in a binder coated on a support is advantageous in terms of practical reliability such as productivity and corrosion resistance. However, the coating type magnetic recording medium has a low packing density of magnetic powder as compared to a thin metal film and thus exhibits poor electro-magnetic characteristics. One widely used coating-type magnetic recording medium comprises a nonmagnetic support having a magnetic layer containing a ferromagnetic iron oxide powder, Co-modified ferromagnetic iron oxide powder, $CrO_2$ powder, ferromagnetic alloy powder, etc. dispersed in a binder coated thereon.

To enhance the electro-magnetic characteristics of the coating-type magnetic recording medium, various approaches, such as improvement of magnetic properties of the ferromagnetic powder and smoothening of the magnetic layer surface, have been proposed. However, these approaches do not adequately enhance the recording density.

As noted above the recording density of the magnetic recording media becomes higher, while the recordable wavelength thereof becomes shorter. Therefore, if the thickness of the magnetic layer is great, the output is extremely decreased because of self-demagnetization during recording or reproduction.

In order to cope with these problems, the thickness of the magnetic layer has been reduced. However, if the thickness of the magnetic layer is about 2 μm or less, the surface of the magnetic layer can be easily influenced by the nonmagnetic support, thereby deteriorating the electro-magnetic characteristics or worsening the output. The rough surface of the nonmagnetic support can be eliminated by providing a nonmagnetic thick undercoating layer on the support before coating the magnetic layer as described in JP-A-57-198536 (the term "JP-A" as used herein means an "unexamined published Japanese patent application"). However, this solution is disadvantageous because of inferior head abrasion and durability. These inferior properties probably attributable to the use of a thermosetting resin as a binder in the lower nonmagnetic layer that results in a hardened lower layer, which in turn produces a magnetic recording medium that is less flexible. Contact of the magnetic layer with the head and other members without buffering abrases the magnetic layer. These problems can be possibly eliminated by using a nonsetting resin as a binder in the lower layer. However, this causes an additional problem; if a magnetic layer is coated as an upper layer after a lower layer coated is dried, the lower layer swells because of an organic solvent in the coating solution of the upper layer. This in turn causes turbulence in the coating solution of the upper layer, deteriorating the surface properties and hence the electro-magnetic characteristics of the magnetic layer.

The reduction of the thickness of the magnetic layer can be possibly accomplished by reducing the coated amount of the coating solution or adding a large amount of a solvent to the magnetic coating solution to lower the concentration thereof. If the former approach is used to reduce the coated amount of the coating solution, the coat layer begins to dry without sufficient leveling, causing coating defects, such as remaining of linear or marking patterns and hence considerably reducing yield. If the latter approach is used to lower the concentration of the magnetic coating solution, the resulting coating layer has many voids, causing various problems. For example, a sufficient packing density of magnetic powder cannot be obtained. Furthermore, the coating layer has an insufficient strength. The invention according to JP-A-62-154225 has a great disadvantage because the yield of the product is so poor.

As an approach for solving these problems, the applicants proposed a magnetic recording medium that has excellent productivity without coating defects and that exhibits improved reproduced output, electro-magnetic characteristics (e.g., C/N) and running durability by employing a simultaneous multi-layer coating process described in JP-A-63-191315 and JP-A-63-187418 to coat an upper magnetic layer comprising a ferromagnetic powder on a lower nonmagnetic layer while the nonmagnetic layer is wet.

However, the following problems cannot be solved even by applying such an approach.

In recent years, magnetic recording media have been required to attain a considerably high surface smoothness to reduce the spacing loss with the head in order to meet the requirements for high recording density and high output. To this end, the lower nonmagnetic layer, which is not externally visible, is also required further to exhibit dispersibility as high as possible and a high surface smoothness if the simultaneous multi-layer coating process is used. In the above mentioned simultaneous multi-layer coating technique, the surface smoothness of the magnetic layer can be possibly improved by using finely divided grains in the lower nonmagnetic layer to attain sufficient surface properties. However, such finely divided grains can easily agglomerate, deteriorating the surface properties of the lower nonmagnetic layer and hence the magnetic layer. This approach is also disadvantageous in that even if the thickness of the magnetic layer is further reduced to improve the electro-magnetic characteristics, the poor dispersibility of the powder in the lower nonmagnetic layer makes it difficult to control the interface of the magnetic layer with the lower nonmagnetic layer, distorting the interface and hence making it impossible to obtain a uniform magnetic layer. In other words, the thinner the magnetic layer is, the greater is the contribution of the dispersibility of the lower nonmagnetic layer to the surface properties of the magnetic layer obtained by the simultaneous multi-layer coating process. The conventional techniques cannot provide proper solutions.

Further, as the surface area of finely divided grains increases, they adsorb or absorb the lubricant contained in the magnetic layer or nonmagnetic layer, remarkably reducing the amount of the lubricant in the surface of the magnetic layer. This aggravates jitter and still life drop, as the friction coefficient of the magnetic recording medium increases.

Moreover, a known approach for improving the dispersibility of a nonmagnetic powder comprises the surface-treatment of the nonmagnetic powder with a known treating agent, such as polyol (e.g., pentaerythritol, trimethylolpropane), organic acid (e.g., aliphatic acid), alkanolamine (e.g., triethanolamine, trimethylolamine) and silicon compound (e.g., silicon resin, alkylchlorosilane) if the nonmagnetic powder is $TiO_2$, silica or the like. These surface-treatments improve the dispersibility of the nonmagnetic powder but provide no improvements in the running durability of the magnetic recording medium. Furthermore, if a lubricant is used in a large amount to improve the running durability of the magnetic recording medium, it results in a reduced film strength.

Thus, the nonmagnetic powder to be used in the magnetic recording medium needs an improved dispersibility. However, no appropriate means have been found.

SUMMARY OF THE INVENTION

It is therefore an object of the present invention to provide a magnetic recording medium having excellent electro-magnetic characteristics.

It is another object of the present invention to provide a magnetic recording medium having excellent dispersibility of the lower nonmagnetic layer, surface smoothness of the magnetic layer, running properties and storage stability.

These and other objects of the present invention will become more apparent from the following detailed description and examples.

These objects of the present invention are accomplished with a magnetic recording medium comprising a nonmagnetic support having a lower nonmagnetic layer comprising an inorganic powder dispersed in a binder coated thereon, and an upper magnetic layer provided on said lower nonmagnetic layer by coating a dispersion of a ferromagnetic powder in a binder thereon, wherein the dry thickness of said upper magnetic layer is in the range of 1.0 µm or less and said lower nonmagnetic layer comprises an inorganic nonmagnetic powder having a surface layer coated with an inorganic oxide.

These objects of the present invention are also accomplished by a process preparing a magnetic recording medium comprising a magnetic layer having a dry thickness of 1.0 micrometer or less, comprising the steps of:

(1) charging an inorganic nonmagnetic powder into a surface-treatment bath to create an inorganic powder surface-coated with a metallic hydroxide;

(2) adding an organic compound and a binder to the surface-coated inorganic powder, wherein the organic compound is capable of being adsorbed by or reacting with the surface-coated inorganic nonmagnetic powder before or simultaneously with the addition of the binder;

(3) mixing the surface-coated inorganic nonmagnetic powder and the organic compound and the binder in admixture;

(4) adding an aliphatic acid to prepare a coating solution for a lower nonmagnetic layer;

(5) coating the coating solution for a lower nonmagnetic layer onto a nonmagnetic support to create a lower nonmagnetic layer on the nonmagnetic support;

(6) dispersing a ferromagnetic powder in a binder to create a coating solution for an upper magnetic layer;

(7) coating the coating solution for an upper magnetic layer onto the lower nonmagnetic layer that is wet, to create an upper magnetic layer on the lower nonmagnetic layer; and then (8) subjecting the coated support to orientation, drying and smoothing, so that the magnetic layer has a dry thickness of 1.0 micrometer or less.

DETAILED DESCRIPTION OF THE INVENTION

In the present invention, the dispersibility of an inorganic powder in the lower nonmagnetic layer is improved to facilitate control over the interface of the lower nonmagnetic layer with the upper magnetic layer, securing the surface properties of the upper magnetic layer while improving the electro-magnetic characteristics of the upper magnetic layer. The present invention is further characterized in that in order to provide an upper magnetic layer (hereinafter simply referred to as "magnetic layer" or "upper layer") having a dry thickness of 1 µm or less (preferably 0.01 to 0.8 µm and more preferably 0.05 to 0.6 µm) on a lower nonmagnetic layer (hereinafter simply referred to as "nonmagnetic layer" or "lower layer") without coating defects, the coating solution for the lower layer comprises an inorganic nonmagnetic powder having a surface layer coated with an inorganic oxide, said subbing layer is coated on said nonmagnetic support, and said upper layer is then coated on said lower layer, preferably while said lower layer is wet. In other words, the present invention provides a magnetic recording medium, comprising an extremely thin magnetic layer and having properties comparable to that of ferromagnetic metal thin film, and that can be mass-produced without coating defects such as pinhole and linear marks.

In the present invention, the details of the mechanism of the dispersibility of the inorganic powder by coating with an inorganic oxide are unknown. This is probably because the water content (hydroxyl group) present in the surface of the inorganic powder interacts with the solvent, giving a good effect on the dispersibility of the powder. The inventors found that the dispersibility of such a powder can be improved by properly controlling the water content contained therein. In other words, in the present invention, the control over the water content is carried out by reacting the water content present in the surface of the inorganic powder with an inorganic compound, and a surface-treated layer made of an inorganic oxide is thus formed on the surface of the inorganic powder.

The water content of the inorganic nonmagnetic powder to be used in the preparation of the coating solution is preferably adjusted to 0.05 to 10% by weight, particularly 0.1 to 8% by weight.

In the present invention, the inorganic oxide or its layer may consist of one or more elements provided that it is in the form of an oxide and may normally have a structure obtained by polymerization via $H_2O$. However, their existing states depend on their preparation methods. For example, $Al_2O_3$ exists on the surface of $TiO_2$ relatively uniformly. On the other hand, $SiO_2$ exists in the form of granular masses.

Further, a surface-treated layer obtained by coprecipitation may be used depending on the purpose. A structure obtained by treating the surface of the powder with alumina and then with silica or vice versa may also be used. The surface-treated layer may be porous depending on the purpose but is normally preferably homogeneous and dense.

Other examples of such an inorganic oxide include $ZrO_2$, $SnO_2$, $Sb_2O_3$, and $ZnO$.

In the present invention, the inorganic nonmagnetic powder may be preferably coated with an inorganic oxide, e.g., $Al_2O_3$ in an amount of generally 1 to 21% by weight, preferably 2 to 18% by weight, $SiO_2$ in an amount of generally 0.04 to 20% by weight, preferably 0.1 to 18% by weight, or $ZrO_2$ in an amount of generally 0.05 to 15% by weight, preferably 0.5 to 10% by weight; based on the total weight of the inorganic nonmagnetic powder.

The proportion of $Al_2O_3$ among these inorganic oxides is preferably in the range of 50% by weight or more, more preferably 55 to 100% by weight, based on the total inorganic oxide.

As the inorganic powder to be surface-treated there may be preferably used a metallic oxide, particularly titanium dioxide ($TiO_2$), barium sulfate ($BaSO_4$), zinc oxide ($ZnO$), $\alpha$-iron oxide. ($\alpha$-$Fe_2O_3$), getite, $CeO_2$, etc.

The inorganic nonmagnetic powder to be used in the present invention is mainly composed of rutile titanium dioxide containing such an inorganic oxide preferably in an amount of 5 to 30% by weight, particularly 7 to 20% by weight. The proportion of the rutile titanium dioxide is preferably 80% by weight based on the inorganic nonmagnetic powder.

The formation of a surface-treated layer on an inorganic nonmagnetic powder is carried out as follows. Specifically, an inorganic nonmagnetic powder material is dry-ground, wet-ground with water and a dispersant, and then subjected to centrifugal separation to sort finely divided grains from coarse grains. The slurry of finely divided grains is then transferred to a surface treatment bath where the grains are surface-coated with a metallic hydroxide. A predetermined amount of an aqueous solution of a salt of Al, Si, Ti, Zr, Sb, Sn, Zn, etc. is added to the system. An acid or alkali that neutralizes the material is then added to the system so that the surface of the inorganic nonmagnetic powder is coated with the resulting hydrous oxide. The by-produced water-soluble salts are removed by decantation, filtration, and washing. Finally, the pH value of the slurry is adjusted. The slurry is filtered off, and then washed with pure water. The cake thus washed is then dried by a spray dryer or band dryer. The dried material is finally ground by means of a jet mill to give a product. Alternatively, instead of using such an aqueous system, a vapor of $AlCl_3$ or $SiCl_4$ may be passed through the inorganic nonmagnetic powder, and water vapor may be then introduced thereinto to effect Al or Si surface treatment.

For other surface treatment methods, reference can be made to T. J. Wiseman et al, "Characterization of Powder Surfaces", 1976, Academic Press.

In the present invention, the lower nonmagnetic layer may comprise an untreated inorganic powder other than the above mentioned inorganic nonmagnetic powder but preferably comprises the surface-coated nonmagnetic powder in an amount of generally 51 to 99.8% by weight, preferably 60 to 95% by weight based on the total weight of all inorganic powders.

In the present invention, the solvents to be used for the lower nonmagnetic layer and the upper magnetic layer each may preferably contain a compound having a solubility parameter of 8 to 11 (particularly 8 to 10) and a dielectric constant of 15 or more (particularly 15 to 25) at 20° C. in an amount of 15% by weight or more (particularly 20 to 100% by weight).

In other words, in the multi-layer coating process of the present invention, the affinity between the upper magnetic layer and the lower nonmagnetic layer is important. In general, the magnetic layer comprises as a main component a solvent having a relatively high polarity such as cyclohexanone and methyl ethyl ketone. After multilayering, the solvent in the upper layer and the lower layer permeates into each other. As a result, if the solvent composition greatly differs from the upper layer to the lower layer, a vigorous surface roughening occurs.

The solvents to be used in the present invention include a single compound or a mixture of a plurality of compounds and generally mean organic solvent compounds in the coating composition. Accordingly, in the present invention, if a plurality of compounds are used to provide a solvent having a solubility parameter of 8 to 11, the kind of compounds used may differ from the upper layer to the lower layer. In practice, however, it is extremely preferred that the kind of compounds used in the upper layer and the lower layer be the same.

The organic solvent compound to be selected preferably has a dielectric constant of 15 or more at 20° C. Such an organic solvent compound is preferably used in an amount of 15% by weight or more. Examples of such a compound include methyl ethyl ketone.

Examples of solvent composition with weight proportion to be used in the present invention include methyl ethyl ketone:cyclohexanone:toluene:butyl acetate =10:5:5:4 (solubility parameter: 9.2) for upper layer and methyl ethyl ketone:cyclohexanone:toluene:butyl acetate=9:5:6:4 (solubility parameter: 9.2) for lower layer. Further, since the kind of the solvents to be used in the upper layer and the lower layer are preferably predetermined to be the same in the present invention, it is inevitably preferred that the kind of binder compounds to be used in the upper layer and the lower layer be the same.

The binder composition may comprise known binders. Preferred examples of such known binders include a mixture of vinyl chloride resin, urethane resin, and polyisocyanate. These binders will be further described later.

The binder used in the lower nonmagnetic layer and upper magnetic layer preferably contains at least one polar group selected from the group consisting of —COOM, —$OSO_3M$, —$SO_3M$, —$PO(OM_1)(OM_2)$, —$OPO(OM_1)(OM_2)$, and —$NR_4X$ (in which M, $M_1$ and $M_2$ each represents Li, Na, K, H, —$NR_4$ or $NHR_3$; R represents an alkyl group or hydrogen atom; and X represents a halogen atom) to improve the dispersibility of the inorganic powder.

In order to secure the dispersibility of the inorganic powder and the ferromagnetic powder as well as the surface properties of the layers, it is preferred that the volumetric ratio of the binder to the inorganic powder in the lower layer be in the range of about 2.0 to 0.3 (particularly about 0.4 to 1.8) and the volumetric ratio of the binder to the ferromagnetic powder in the upper layer be in the range of about 1.8 to 0.5 (particularly about 0.6 to 1.5).

In the magnetic recording medium of the present invention, the lower nonmagnetic layer preferably comprises an organic compound, other than the aliphatic acid, that is capable of being adsorbed by or reacting with the inorganic powder. More preferably, the inorganic powder contained in the lower nonmagnetic layer is a metallic oxide, and the organic compound consists of at least one surface-treating agent selected from the group consisting of an organic acid having a pKa value of 3 or less, an epoxy group-containing compound having a molecular weight of 3,000 or less, a silane coupling agent, and a titanate coupling agent.

Further preferably, the magnetic recording medium of the present invention contains an aliphatic acid in an amount of 2.0% by weight or less based on the total weight of the lower nonmagnetic layer and the upper magnetic layer, and the extractability therefrom with n-hexane is in the range of 50% by weight or more.

In the present invention, the dispersibility of the inorganic powder in the lower nonmagnetic layer is improved to facilitate the control over the interface of the lower nonmagnetic layer with the upper magnetic layer, securing the surface properties of the upper magnetic layer, as well as controlling the interaction of the inorganic powder contained in the lower nonmagnetic layer with the aliphatic acid, and hence, the content of the aliphatic acid in the lower nonmagnetic layer and the upper magnetic layer. Thus, the running durability of the upper magnetic layer can be improved while particularly enhancing the electromagnetic characteristics in the short wavelength recording. Furthermore, in the present invention, in order to provide an upper magnetic layer having a dry thickness of 1 μm or less on a lower nonmagnetic layer without causing coating defects, a lower layer coating solution comprising an inorganic powder surface-treated with an inorganic oxide is used and the upper layer is coated on the lower layer while the lower layer is wet. Thus, the present invention provides a magnetic recording medium comprising an extremely thin magnetic layer and having properties comparable to that of thin ferromagnetic metal layer which can be mass-produced without coating defects such as pinhole and linear marks.

In the present invention, the lower nonmagnetic layer preferably comprises an aliphatic acid and an organic compound other than the aliphatic acid capable of being adsorbed by or reacting with an inorganic powder surface-coated with an inorganic oxide. The inorganic powder contained in the lower nonmagnetic layer is adsorbed by or reacts with the organic compound so that it can be kept carried on the surface of the inorganic powder. In other words, in the present invention, the proportion or probability of the adsorption of the aliphatic acid by the inorganic powder is relatively reduced. With this arrangement, the proportion of the aliphatic acid free from the inorganic powder in the lower layer is increased. The free aliphatic acid gradually oozes from the surface of the upper magnetic layer, improving the running properties of the magnetic recording medium. Further, since the amount of the free aliphatic acid is higher than ever, the absolute amount of the aliphatic acid to be incorporated in the magnetic recording medium can be reduced more than ever, eventually inhibiting troubles caused by the plasticization of the magnetic recording medium. Moreover, the inorganic powder carrying the organic compound has an effect of improving the dispersibility of the lower layer.

The organic compound is not specifically limited provided that it satisfies the above mentioned functions. Such an organic compound is preferably an organic compound containing a functional group which reacts with a functional group, e.g., OH group contained in the inorganic powder to form a chemical bond with the inorganic powder via which it is firmly carried by the inorganic powder. Specific examples of such an organic compound include surface treatments such as organic acid having pKa of 3 or less, epoxy group-containing compound having a molecular weight of 3,000 or less, silane coupling agent, and titanate coupling agent. These organic compounds can be used singly or in combination.

The process for adsorbing the organic compound by or reacting the organic compound with the inorganic powder surface-coated with an inorganic oxide is not specifically limited, but any means can be employed. For example, the inorganic compound and the inorganic powder may be mixed before the preparation of the coating solution to allow the surface of the inorganic powder to adsorb or react with the organic compound. Alternatively, when the inorganic powder and the binder are kneaded for dispersion in the preparation of the coating solution, the organic compound may be added to the system at any proper time so that it is adsorbed by or reacts with the inorganic powder.

In the present invention, the time at which the organic compound is added to the system during the preparation of the coating solution for the lower nonmagnetic layer is predetermined. In other words, it is important that the organic compound is added to the system before or at the same time as the dispersion of the binder and the inorganic powder surface-coated with an inorganic oxide in admixture. That is, the aliphatic acid is added to the system after the dispersion of the inorganic powder, organic compound and binder in admixture.

The inventors found that if an aliphatic acid is added to the system after the dispersion of the organic compound, inorganic powder and binder in admixture to prepare the coating solution for lower layer, the inorganic powder is adsorbed by the organic compound and dispersed in the resin, thus inhibiting the adsorption of the aliphatic acid with the inorganic powder. In the present invention, this effect becomes remarkable when the organic compound selected is one having a three-dimensionally complex structure as compared with that of the aliphatic acid.

In the present invention, the total amount of the aliphatic acid to be incorporated into the upper layer and the lower layer in the magnetic recording medium and the amount of free aliphatic acid which has not been adsorbed by or reacted with the inorganic powder surface-coated with an inorganic oxide are preferably predetermined. This is particularly true in view of the feature of an aliphatic acid that it can be easily extracted with n-hexane when it is free but can hardly be extracted when adsorbed by an inorganic powder. In other words, the present invention is characterized by a magnetic recording medium comprising an aliphatic acid in an amount of generally 2.0% by weight or less, preferably 1.5% by weight or less based on the total weight of the upper layer and the lower layer, the amount of the aliphatic acid to be extracted with n-hexane (i.e., free aliphatic acid) being controlled to generally 50% by weight or more, preferably 60% by weight or more. If the amount of the free aliphatic acid falls below 50% by weight or the absolute amount of the aliphatic acid exceeds 2.0% by weight, it disadvantageously accelerates the plasticization of the coat made of upper layer and lower layer or deteriorates the dispersibility, lowering the surface properties, the coat strength and the supply of the aliphatic acid to the surface of the upper layer, and hence deteriorating the running properties.

The amount of free aliphatic acid is represented by (100× amount of free aliphatic acid in the upper layer and the lower layer/total amount of aliphatic acid in the upper layer and the lower layer) and is calculated from measurements obtained by the following quantitative determination methods:
(1) Measurement of the total amount of aliphatic acid in the upper layer and the lower layer (measurement of charged amount):

The coat made of upper layer and lower layer is scraped off the magnetic recording medium by a cutter blade or the like and then weighed. Powders such as ferromagnetic powder and inorganic powder in the material are then treated with 12N hydrochloric acid. The material is then extracted with n-hexane in an amount of 200 ml per g of coat. The resulting oil phase is then separated from the material through a separatory funnel. The aliphatic acid in the oil phase is determined by gas chromatography.

(2) Measurement of the amount of free aliphatic acid in the upper layer and the lower layer:

The upper layer and the lower layer are scraped off the magnetic recording medium by a cutter blade or the like and then weighed. The material is then extracted with n-hexane in an amount of 200 ml per g of coat. The aliphatic acid in the resulting oil phase is then determined by gas chromatography.

Gas chromatography conditions: solvent cut, column temperature of 150° to 280° C., rate of temperature increase of 8° C./min.

In the present invention, the means of controlling the amount of free aliphatic acid is not specifically limited. Any means can be employed. Preferably, as previously described, the amount of free aliphatic acid is controlled by treating the inorganic powder with an organic compound capable of being adsorbed by or reacting with the inorganic powder.

The organic compound to be used in the present invention is further described hereinafter.

Examples of organic acid having pKa of 3 or more include α-naphthylphosphoric acid, phenylphosphoric acid, diphenylphosphoric acid, p-ethylbenzenephosphonic acid, phenylphosphonic acid, phenylphosphic acid, methanesulfonic acid, benzensulfonic acid, p-toluenesulfonic acid, naphthalene-α-sulfonic acid, and naphthalene-β-sulfonic acid.

Examples of epoxy group-containing compound include those having the following structural formulae:

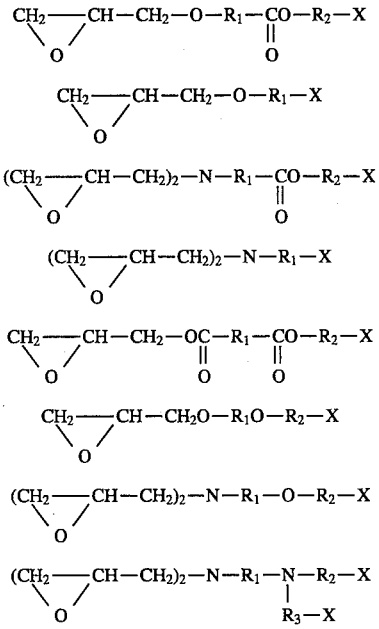

wherein $R_1$, $R_2$ and $R_3$ each represents an aliphatic or aromatic group such as —$CH_2CH_2$—, —$CH_2$—$CH_2$—$CH_2$—,

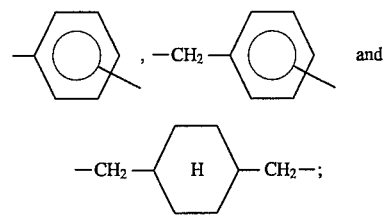

and X represents —$SO_3M$, —$OSO_3M$, —$OPO(OM)_2$, —$PO(OM)_2$ or —COOM (in which M represents a hydrogen atom or alkaline metal).

Specific examples of silane coupling agent include vinylethoxy silane, vinyltris(β-methoxyethoxy)silane, γ-methacryloxypropyl trimethoxy silane, β-(3,4-epoxycyclohexyl)ethylmethoxy silane, N-β(aminoethyl)-γ-(aminopropyl trimethoxy silane, γ-aminopropyl methyldimethoxy silane, γ-aminopropyl triethoxy silane, N-phenyl-γ-aminopropyl trimethoxy silane, γ-mercaptopropyl trimethoxy silane, and γ-chloropropy trimethoxy silane.

Specific examples of titanate coupling agent include isopropyl triisostearoyl titanate, isopropyltri(N-aminoethylaminoethyl)titanate, tetraoctylbis(ditridecylphosphite) titanate, tetra(2,2-diallyloxymethyltributyl)bis(tridecyl) phosphite titanate, bis(dioctylvylophosphate)oxyanate, bis-(dioctylvylophosphate)ethylene titanate, isopropyltrioctanoyl titanate, isopropyldimethacrylisostearoyl titanate, isopropyltridecylbenzenesulfonyl titanate, isopropylstearoyldiacryl titanate, isopropyltri(dioctylphosphate) titanate, isopropyltriamyl titanate, and tetraisopropylbis(dioctylphosphite)titanate.

The added amount of such an organic compound is preferably in the range of 0.3 to 30 μmol/m², particularly 1 to 10 μmol/m² with respect to the specific surface area of inorganic powder as determined by the BET method.

In the present invention, it is preferred that the interface of the upper layer with the lower layer be flat and the thickness of the upper magnetic layer be as uniform as possible. The present invention contributes to this arrangement. In order to further meet these requirements, other controlling factors are preferably selected.

Specific examples of approaches for controlling the disorder of the interface include the following two approaches:

One approach is to control the magnetic coating to be contained in the magnetic layer and the dispersions to be contained in the lower nonmagnetic layer so that their thixotropy approximate to each other. A second approach is to specify the size and shape of powders to be contained in the lower nonmagnetic layer and the magnetic layer so that the upper layer and the lower layer are dynamically controlled to have no mixed zones therebetween.

As a specific example of the first approach is a method which comprises adjusting the ratio ($A10^4/A10$) of the shearing stress at a shear rate of $10^4$ sec$^{-1}$ ($A10^4$) to the shearing stress at a shear rate of 10 sec$^{-1}$ ($A10$) to from 3 to 100, both inclusive.

As a specific example of the second approach is a method which comprises using an acicular nonmagnetic powder or scaly nonmagnetic powder to be contained in the lower nonmagnetic layer so that no mixed zones occur at the interface of the lower nonmagnetic layer with the upper magnetic layer. As compared with the conventional granular nonmagnetic powder, an acicular nonmagnetic powder occurring in order can form a firm coat. Thus, the arrangement can be controlled so as to cause no mixing at the interface even if the ferromagnetic powder contained in the upper magnetic layer rotates. Another approach for reducing mixed zones is to use a scaly nonmagnetic powder to be contained in the lower nonmagnetic layer, i.e., to make a tile-like spread of nonmagnetic powder. Also with this arrangement, no mixing occurs at the interface even if the ferromagnetic powder in the upper magnetic layer rotates.

Factors contributing to these arrangements, those in the present invention inclusive, include (1) grain size (e.g., specific surface area, mean primary grain diameter), (2) structure (e.g., oil absorption, grain form), (3) surface properties of powder (e.g., pH, heat loss), and (4) attraction of grain (e.g., γs), concerning inorganic powder or magnetic powder to be dispersed, (1) molecular weight, and (2) kind of functional group, concerning binder, and (1) kind of solvent (e.g., polarity), (2) solubility of solvent, and (3) formulation of solvent (e.g., water content), concerning solvent.

In the magnetic recording medium of the present invention, the average value Δd of the fluctuations of the thickness at the interface (i.e., vertical fluctuations at the interface) is preferably half or less of the average value d of the dry thickness of the magnetic layer, and the standard deviation 3σ of the thickness of the magnetic layer is generally 0.6 μm or less and σ is preferably 0.2 μm or less. This means that when 3σ is 0.6 μm or less, 97% of each segment may fall within 0.6 μm or less. Further, 3σ is preferably not more than 6d/10.

These values d, Δd and σ can be determined as follows.

The magnetic recording medium is lengthwise cut into a specimen having a thickness of about 0.1 μm by means of a diamond cutter. The specimen is then observed and photographed under a transmission electron microscope at generally a magnification of 10,000 to 100,000, preferably a magnification of 20,000 to 50,000 (print size: A4 to A5). Paying attention to the difference in shape between the ferromagnetic powder and the inorganic powder in the upper magnetic layer and the lower nonmagnetic layer, the interface is visually judged and bordered with a black marking line and the surface of the magnetic layer is also bordered with a black marking line on the photograph.

The process for determining Δd will be now described. The distance between the surface of the bordered upper magnetic layer and the peak or valley of the interface of the lower nonmagnetic layer is defined as Δd. For the determination of standard deviation σ, the gap between the black marking line thus formed and the border line formed by an image processor IBAS2 available from Zeiss is measured. The thickness d of the magnetic layer is measured for 100 to 300 segments over 21 cm.

Assuming that thickness of each segment is $x_i$, the standard deviation σ can be determined by the following equation:

$$\text{Standard deviation } \sigma = \sqrt{\frac{\sum_{i=1}^{n}(X_i - d)^2}{n}}$$

$(n = 100 \text{ to } 300)$

Δd takes into account only the distortion at the interface. The standard deviation σ of the average thickness d means the fluctuations of the thickness of the upper magnetic layer including both the factor of surface roughness of the upper magnetic layer and the distortion at the interface. The distortion at the interface is preferably 0.6 μm or less as calculated in terms of 3σ.

In this arrangement, the uniformity of the thickness of the magnetic layer can be secured, and the surface roughness Ra can be controlled to not more than λ/50 or more, i.e., λ/Ra can be controlled to 50 or more, preferably 75 or more, more preferably 100 or more. Ra indicates a center-line average roughness determined by an optical interference roughness meter.

Further, d is preferably in a relationship with the shortest recordable wavelength λ that satisfies $\lambda/4 \leq d \leq 3\lambda$, preferably $\lambda/4 \leq d \leq 2\lambda$ (i.e., $0.25 \leq d \leq 2$). The surface roughness Ra of the magnetic layer is preferably not more than λ/50.

In this arrangement, the fluctuations of reproduced output and the generation of noise in the amplitude modulation can be avoided to realize a high reproduced output and a high C/N ratio.

In the present invention, the shortest recordable wavelength λ depends on the kind of the magnetic recording medium. For example, 8-mm metal video tapes have a shortest recordable wavelength of 0.7 μm, digital video tapes have a shortest recordable wavelength of 0.5 μm, and digital audio tapes have a shortest recordable wavelength of 0.67 μm.

As mentioned above, the thickness of the magnetic layer can be measured. Another method can be used. First, the peculiar elements contained in the magnetic layer specimen having a known thickness are determined by fluorescent X-ray. A calibration curve is then prepared from these measurements. The thickness of an unknown specimen can then be-determined from the intensity of fluorescent X-ray on the basis of the calibration curve.

In the present invention, the root mean square of roughness $R_{rms}$ of the surface of the magnetic layer, determined by the scanning tunnel microscopy (STM), is preferably in a relationship with the average value d of the dry thickness of the magnetic layer that satisfies $30 \leq d/R_{rms}$.

If the thickness of the magnetic layer is reduced, the self-demagnetization loss should be lowered to realize an enhancement of output. However, since the compressable margin of the magnetic layer is reduced due to the thickness drop, the magnetic layer shows a worse calenderability, and hence, an increased surface roughness. In order to reduce the self-demagnetization loss to enhance the output, the surface roughness value satisfying the above specified relationship in terms of STM is preferably used.

$R_{rms}$ by AFM is preferably 10 nm or less. As determined by 3d-MIRAU, optical interference surface roughness Ra is preferably in the range of 1 to 4 nm, $R_{rms}$ is preferably in the range of 1.3 to 6 nm, and P-V value (peak-valley value) is preferably in the range of 80 nm or less.

The glossiness of the surface of the magnetic layer is preferably in the range of 250 to 400% after calendering.

Such surface properties can be attained by further meeting at least one of the following requirements under the conditions of the present invention:

(1) The nonmagnetic powder to be contained in the lower nonmagnetic layer comprises an inorganic powder having a Mohs' hardness of 3 or more, the ferromagnetic powder to be contained in the upper magnetic layer is an acicular ferromagnetic powder, and the average grain diameter of the inorganic powder is ½ to 4 times the crystallite size of the acicular ferromagnetic powder;

(2) The nonmagnetic powder to be contained in the lower nonmagnetic layer comprises an inorganic powder having a Mohs' hardness of 3 or more, the ferromagnetic powder to be contained in the upper magnetic layer is an acicular ferromagnetic powder, and the average grain diameter of the inorganic powder is ⅓ or less of the length in the long axis of the acicular ferromagnetic powder; and (3) The ferromagnetic powder to be contained in the upper magnetic layer is a hexagonal tabular ferromagnetic powder having an axis of easy magnetization in the direction perpendicular to the plane of grain, and the nonmagnetic powder to be contained in the lower nonmagnetic layer comprises an inorganic powder having an average grain diameter of not more than the granular diameter of the ferromagnetic powder to be contained in the upper magnetic layer.

In the requirements (1) to (3), the size and shape of the ferromagnetic powder to be contained in the upper magnetic layer and the inorganic powder to be contained in the lower nonmagnetic layer are defined so as to secure the surface properties of the lower nonmagnetic layer, and the inorganic powder has a size such that the ferromagnetic powder is dynamically stabilized and arranged in order.

The volumetric packing density of the inorganic powder in the lower layer is preferably in the range of 20 to 60%, more preferably 25 to 55%.

The inorganic powder is preferably contained in a weight proportion of 60% or more based on the weight of the nonmagnetic powder. Such inorganic powders preferably include metallic oxide powder, alkaline earth metal salt powder or the like. It is expected that the incorporation of carbon black gives known effects (e.g., reduction of electrical surface resistivity). It is therefore preferred to use carbon black in combination with the inorganic powder. However, since carbon black has considerably poor dispersibility, it cannot obtain sufficient electro-magnetic characteristics. In order to obtain an excellent dispersibility, it is necessary that the metallic oxide, metal, and alkaline earth metal salt be selected in a weight proportion of 60% or more of the nonmagnetic powder. If the content of the inorganic powder falls below 60% by weight based on the weight of the nonmagnetic powder and the content of carbon black exceeds 40% by weight based on the nonmagnetic powder, the dispersibility of the system is insufficient, making it impossible to obtain desirable electro-magnetic characteristics.

Further, if the thickness of the magnetic layer is not more than 5 times the length in the long axis of the grain, the packing density can be remarkably enhanced by calendering, which makes it possible to obtain a magnetic recording medium having better electro-magnetic characteristics.

General items that can be selected in the present invention will be described hereinafter.

Examples of the inorganic powder which can be used in the present invention include metal powder, metallic oxide powder, metallic carbonate powder, metallic sulfate powder, metallic nitride powder, metallic carbide powder, and metallic sulfide powder. Specific examples of such an inorganic powder include $TiO_2$ (rutile, anatase), $TiO_x$, cerium oxide, tin oxide, tungsten oxide, ZnO, $ZrO_2$, $SiO_2$, $Cr_2O_3$, $\alpha$-alumina having a $\alpha$ conversion of 90% or more, $\beta$-alumina, $\gamma$-alumina, $\alpha$-iron oxide, getite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium oxide. These inorganic powders may be used singly or in combination. The grain shape and size of these inorganic powders can be arbitrarily selected. If desired, different kinds of inorganic powders can be used in combination. If a single kind of an inorganic powder is used, the distribution of grain diameters can be properly selected.

Preferably, an inorganic powder has the following properties. The inorganic powder preferably has a tap density of 0.05 to 2 g/ml, preferably 0.2 to 1.5 g/ml; a water content of 0.1 to 5%, preferably 0.2 to 3%; a pH value of 2 to 11, preferably 4 to 10; a specific surface area of 1 to 100 $m^2/g$, preferably 5 to 70 $m^2/g$, more preferably 7 to 50 $m^2/g$; and a crystallite size of 0.01 to 2 μm. The inorganic powder has an average grain diameter of 0.1 μm or less, preferably 0.08 μm or less if it is granular such as cubic. If it is acicular, the inorganic powder has a length in the long axis of 0.05 to 1.0 μm, preferably 0.06 to 0.5 μm, and an acicular ratio of 3 to 30, preferably 5 to 15. The inorganic powder preferably exhibits a DBP oil adsorption of 5 to 100 ml/100 g, more preferably 10 to 80 ml/100 g, most preferably 20 to 60 ml/100 g. The inorganic powder preferably exhibits an SA (stearic acid) adsorption of 1 to 20 $\mu mol/m^2$, more preferably 2 to 15 $\mu mol/m^2$. The inorganic powder preferably exhibits a surface roughness factor of 0.8 to 1.5, particularly 0.9 to 1.4. The inorganic powder preferably exhibits a heat of wetting by water of 200 $erg/cm^2$ to 600 $erg/cm^2$ at a temperature of 25° C. Additionally, a solvent whose heat of wetting falls within this range can be used. The number of water molecules existing on the surface of the inorganic powder at a temperature of 100°to 400° C. is preferably in the range of 1 to 10 per 100 Å. The inorganic powder preferably exhibits a pH value of 3 to 9 at the isoelectric point in water. The inorganic powder preferably exhibits a specific gravity of 1 to 12, more particularly 3 to 6. The inorganic powder preferably exhibits an ignition loss of 20% or less.

The above mentioned inorganic powder does not necessarily need to be 100% pure but may be treated with other compounds, such as Al, Si, Ti, Zr, Sn, Sb and Zn compounds, so that their oxides are formed. In this case, if the purity is 70% or higher, its effects cannot be reduced.

Specific examples of the inorganic powder to be used in the present invention include UA5600 and UA5605 manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, and R516 manufactured by Toda Kogyo Co., Ltd.; TTO-51B, TTO-55A, TTO-55B, TTO-55C, TTO-55S, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha Ltd.; ECT-52, STT-4D, STT-30D, STT-30, and STT-65C manufactured by Titan Kogyo K.K.; T-1 manufactured by Mitsubishi Material Co., Ltd.; NS-O, NS-3Y, and NS-8Y manufactured by Nippon Shokubai Kagaku Kogyo Co., Ltd.; MT-100S, MT-100T, MT-150W, MT-500B, MT-600B, and MT-100E manufactured by Teika K.K.; FINEX-25, BF-1, BF-10, BF-20, BF1L, and BF-10P manufactured by Sakai Chemical Industry Co., Ltd.; DEFIC-Y, and DEFIC-R manufactured by Dowa Mining Co., Ltd.; and Y-LOP manufactured by Titan Kogyo K.K.; and its calcined product.

As the nonmagnetic inorganic powder to be used in the present invention, titanium oxides (titanium dioxide in particular) are particularly preferred. The process for the preparation of titanium oxides is further described. Processes for the preparation of titanium oxides can be roughly divided into two processes, i.e., the sulfuric acid process and the chlorine process.

In the sulfuric acid process, illuminite ore is distilled in sulfuric acid to extract Ti, Fe and etc., therefrom in the form of sulfate. Iron sulfate is then removed by crystallization. The remaining titanyl oxide solution is purified by filtration and heat-hydrolyzed to precipitate hydrous titanium oxide. The hydrous titanium oxide is filtered off and then washed. Impurities are then removed from the material by washing. A grain diameter adjustor or the like is added to the material. The material is then calcined at a temperature of 80°to 1,000° C. to produce crude titanium oxide. Rutile or anatase titanium oxide can be selected by the kind of nucleating agent to be added during hydrolysis. The crude titanium oxide is then subjected to grinding, granulation, surface treatment, etc., to prepare the desired nonmagnetic inorganic powder.

In the chlorine process, natural rutile ore or synthetic rutile is used. The ore is chlorinated at an elevated temperature in a reducing atmosphere to convert Ti to $TiCl_4$ and Fe to $FeCl_2$. After cooling, the resulting solid iron oxide is separated from the liquid $TiCl_4$. The crude $TiCl_4$ thus obtained is then rectified. A nucleating agent is then added to the material. The material is momentarily reacted with oxygen at a temperature of 1,000° C. or higher to obtain crude titanium oxide. The crude titanium oxide produced in the oxidative decomposition process is then subjected to finishing for pigment properties in the same manner as in the sulfuric acid process.

Preferred examples of the inorganic oxide to be coated on the surface of the inorganic powder to be contained in the lower nonmagnetic layer include $Al_2O_3$, $SiO_2$, $TiO_2$, $ZrO_2$, $SnO_2$, $Sb_2O_3$, and ZnO. Particularly preferred among these inorganic oxides are $Al_2O_3$, $SiO_2$, and $ZrO_2$. These inorganic oxides may be used singly or in combination. Further, a co-precipitated surface-treated layer may be used depending on the purpose. Alternatively, a structure obtained by the treatment of the inorganic powder with alumina and then the treatment of the surface layer thereof with silica or vice versa may be used. The surface-treated layer may be porous depending on the purpose but is generally preferably homogeneous and dense.

In the present invention, the lower layer may comprise carbon black to attain known effects, e.g., reduction of Rs (electrical surface resistivity). This carbon black can be furnace black for rubber, thermal black for rubber, black for color, acetylene black, etc. Such carbon black preferably has a specific surface area of 100 to 500 $m^2/g$, more preferably 150 to 400 $m^2/g$, DBP oil adsorption of 20 to 400 ml/100 g, more preferably 30 to 200 ml/100 g, average grain diameter of 5 mμ to 80 μ, more preferably 10 μ to 50 mμ, most preferably 10 mμ to 40 mμ, pH value of 2 to 10, water content of 0.1 to 10%, and tap density of 0.1 to 1 g/ml.

Specific examples of carbon black to be used in the present invention include BLACKPEARLS 2000, 1300, 1000, 900, 800, 880, 700, VULCAN and XC-72 produced by Cabot Co., Ltd.; #3050, #3150, #3250, #3750, #3950, #2400 B, #2300, #1000, #970, #950, #900, #850, #650, #40, MA40, and MA-600 produced by Mitsubishi Chemical Corporation; CONDUCTEX SC produced by Columbia Carbon Co., Ltd.; 8800, 8000, 7000, 5750, 5250, 3500, 2100, 2000, 1800, 1500, 1255, and 1250 produced by RAVEN Co., Ltd.; and Ketjen Black EC produced by Agzo Co., Ltd. These carbon blacks may be surface-treated with a dispersant, grafted with a resin or partially graphtized before use. These carbon blacks may be previously dispersed in a binder before being added to the nonmagnetic coating solution. These carbon blacks may be used singly or in combination.

For carbon blacks which can be used in the present invention, reference can be made to "Handbook of Carbon Black", Carbon Black Kyokai Examples of the nonmagnetic inorganic powder to be used in the present invention include acrylstyrene resin powder, benzoguanamine resin powder, melamine resin powder, and phthalocyanine pigment. Specifically, polyolefin resin powder, polyester resin powder, polyamide resin powder, polyimide resin powder, and poly(ethylene fluoride) resin powder can be used. As methods for the preparation of these nonmagnetic inorganic powders, one may use those described in JP-A-62-18564, and JP-A-60-255827.

Such a nonmagnetic powder may be normally used in a weight proportion of 0.1 to 20 or a volumetic proportion of 0.1 to 10 based on the binder.

In general magnetic recording media, an undercoating layer is provided. This undercoating layer having a thickness of 0.5 μm or less is adapted to enhance the adhesion between the support and the magnetic layer. Thus, this undercoating layer differs from the lower nonmagnetic layer according to the present invention. In the present invention, too, the undercoating layer is preferably provided to enhance the adhesion between the lower layer and the support.

As the ferromagnetic powder to be incorporated into the magnetic layer of the present invention there can be used a known ferromagnetic powder such as magnetic iron oxide FeOx (in which x=1.33 to 1.5) powder, Co-modified FeOx (in which x=1.33 to 1.5) powder, ferromagnetic alloy powder comprising Fe, Ni or Co as main component (75% or more), barium ferrite powder and strontium ferrite powder. Particularly preferred among these ferromagnetic powders is ferromagnetic alloy powder. Such a ferromagnetic powder may further contain atoms other than predetermined atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Such a ferromagnetic powder may be treated with a dispersant, lubricant, surface active agent or antistatic agent (as described later) before dispersion. This is further described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, and JP-B-48-39639 (the term "JP-B" as used herein means an "examined Japanese patent publication"), and U.S. Pat. Nos. 3,026,215, 3,031,341, 3,100,194, 3,242,005, and 3,389,014.

Among the above mentioned ferromagnetic powders, the ferromagnetic alloy powder may contain a small amount of hydroxide or oxide. In order to prepare such a ferromagnetic alloy powder, known preparation methods can be used. These methods include a method which comprises reduction with a composite organic acid salt (mainly oxalate) and a reducing gas such as hydrogen, a method which comprises reduction of iron oxide with a reducing gas such as hydrogen to obtain Fe or Fe—Co grains, a method which comprises pyrolysis of a metallic carbonyl compound, a method which comprises adding a reducing agent such as sodium borohydride, hypophosphite and hydrazine to an aqueous solution of a ferromagnetic metal to reduce the ferromagnetic metal, and a method which comprises evaporation of a metal in an inert gas under reduced pressure to obtain a finely divided powder. The ferromagnetic alloy powder thus obtained may be subjected to a known gradual oxidation treatment such as a process which comprises dipping the ferromagnetic alloy powder into an organic solvent and then drying the material, a process which comprises dipping the ferromagnetic alloy powder into an organic solvent with an oxygen-containing gas bubbled thereinto to form an oxide film on the surface of the ferromagnetic alloy powder and then drying the material, and a process which comprises controlling the partial pressure of oxygen gas and inert gas instead of using an organic solvent to form an oxide film on the surface of the ferromagnetic alloy powder.

The ferromagnetic powder to be incorporated in the upper magnetic layer of the present invention exhibits a specific surface area of generally 25 to 80 $m^2/g$, preferably 40 to 70 $m^2/g$ as determined by FET method. If the specific surface area falls below 25 m²/g, the resulting magnetic recording medium has a high noise. On the contrary, if the specific surface area exceeds 80 m²/g, the desired surface properties cannot be easily obtained. The crystallite size of the ferromagnetic powder to be incorporated into the upper magnetic layer of the present invention is in the range of generally 100 to 450 Å, preferably 100 to 350 Å. The magnetic iron oxide powder exhibits saturated magnetization ($\sigma s$) of generally 50 emu/g or more, preferably 70 emu/g or more. In the case of ferromagnetic metal powder, it is preferably in the range of 100 emu/g or more, more preferably from 110 emu/g to 170 emu/g. The ferromagnetic powder exhibits a coercive force of generally 1,100 Oe or more, preferably 2,500 Oe or more, more preferably from 1,400 Oe to 2,000 Oe. The ferromagnetic powder preferably exhibits an acicular ratio of 18 or less, more preferably 12 or less.

The ferromagnetic powder preferably exhibits r1500 of 1.5 or less, more preferably 1.0 or less. The r1500 indicates the percentage of magnetization left uninverted in a magnetic recording medium which has been magnetized to saturation when it is in a magnetic field of 1,500 Oe in the opposite direction.

The ferromagnetic powder preferably exhibits a water content of 0.01 to 2%. The water content of the ferromagnetic powder is preferably optimized by the kind of the binder to be used in combination therewith. The tap density of γ-iron oxide is preferably in the range of 0.5 g/ml or more, more preferably 0.8 g/ml or more. In the case of alloy powder, it is preferably in the range of 0.2 to 0.8 g/ml. If it exceeds 0.8 g/ml, the ferromagnetic powder can be easily oxidized during compaction, making it difficult to obtain sufficient saturated magnetization ($\sigma s$). On the contrary, if it falls below 0.2 ml/g, the dispersibility of the ferromagnetic powder can be insufficient.

If FeOx (γ-iron oxide) is used, the ratio of the divalent iron to the trivalent iron is preferably in the range of 0 to 20%, more preferably 5 to 10%. The proportion of cobalt atom to iron atom is in the range of 0 to 15%, preferably 2 to 8%.

The pH value of the ferromagnetic powder is preferably optimized by the kind of binder to be used. The pH value of the ferromagnetic powder is in the range of 4 to 12, preferably 6 to 10. The ferromagnetic powder may be subjected to surface treatment with Al Si, P or oxide thereof as necessary. The amount of such a surface treatment is in the range of 0.1 to 10%. The adsorption of a lubricant such as aliphatic acid by the ferromagnetic powder thus surface-treated is advantageously in the range of 100 mg/m². The ferromagnetic powder may contain soluble inorganic ions such as Na, Ca, Fe, Ni and Sr ions in some cases. If the content of such an inorganic ion is 500 ppm or less, there are no remarkable effects on the properties.

The ferromagnetic powder to be used in the present invention preferably has as small a void as possible, i.e., generally 20 vol % or less, more preferably 5 vol % or less. The shape of the ferromagnetic grains may be selected from acicular, granular, ellipsoidal, tabular shapes, etc. so as to satisfy the above mentioned requirements. In order to keep SFD of the ferromagnetic powder to 0.6 or less, the distribution of Hc in the ferromagnetic powder needs to be reduced. To this end, the grain size distribution of getite may be improved. Further, γ-hematite may be prevented from being sintered. For cobalt-modified iron oxide, the rate of coating of cobalt may be lower than ever.

In the present invention, the hexagonal tabular ferromagnetic powder having a magnetizable axis in the direction perpendicular to the tabular plane is exemplified by a hexagonal tabular ferrite. Substitutes for such a hexagonal tabular ferrite include: barium ferrite, substituted strontium ferrite, substituted lead ferrite, substituted calcium ferrite, and cobalt-substituted barium, strontium, lead and calcium ferrites, hexagonal cobalt powder, etc. Specific examples of such compositions include: magnetoplanbite-type barium ferrite, magnetoplanbite-type strontium ferrite, and magnetoplanbite-type barium and strontium ferrites partially comprising a spinel phase. Particularly preferred among these ferrites are substituted barium and strontium ferrites. Further, materials obtained by incorporating elements such as Co—Ti, Co—Ti—Zr, Co—Ti—Zn, Ni—Ti—Zn and Ir—Zn into the above mentioned hexagonal system ferrites can be used to control the coercive force of the ferromagnetic powder.

If barium ferrite is used, the tabular diameter indicates the width of the hexagonal tablet determined under an electron microscope. In the present invention, the tabular diameter of the hexagonal system ferrite is preferably in the range of 0.001 to 1 μm, and the tabular thickness thereof is preferably in the range of ½ to 1/20 of the tabular diameter. The specific surface area ($S_{BET}$) of the grain is preferably in the range of 1 to 60 m²/g, and the specific gravity thereof is preferably in the range of 4 to 6.

The binder resin, to be incorporated in the upper magnetic layer and the lower nonmagnetic layer in the magnetic recording medium of the present invention, include: known thermoplastic resins, thermosetting resins, reactive resins or mixtures thereof. Thermoplastic resins include those having a glass transition temperature of −100° C. to 150° C., a number-average molecular weight of 1,000 to 200,000, preferably 10,000 to 100,000, and a polymerization degree of about 50 to 1,000. Examples of such thermoplastic resins include: polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins. Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, a mixture of polyester polyol and polyisocyanate, and a mixture of polyurethane and polyisocyanate.

These resins are further described in "Plastic Handbook", Asakura Shoten.

Further, known electron radiation curing resins can be incorporated into either the upper layer or the lower layer. Examples of these resins and their preparation methods are further described in JP-A-62-256219.

These resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane.

Of all these binders, those in which at least one polar group selected from —COOM, —SO₃M, —OSO₃M, —$P=O(OM_1)(OM_2)$, —$OP=(OM_1)(OM_2)$, —$NR_4X$ (in which M, $M_1$, and $M_2$ each represents a hydrogen atom, lithium atom, sodium atom, potassium atom, —$NR_4$ or —$NHR_3$, R represents an alkyl group or hydrogen atom, and X represents a halogen atom), OH, $NR^2$, $N^+R^3$ (in which R is a hydrocarbon group), epoxy group, SH and CN has been introduced by copolymerization or addition reaction may be optionally used to obtain better dispersibility and durability. The amount of such a polar group is in the range of generally $1\times10^{-1}$ to $1\times10^{-8}$ mole/g, preferably $1\times10^{-2}$ to $1\times10^{-6}$ mole/g.

Preferred examples of the vinyl chloride copolymer include epoxy group-containing vinyl chloride copolymers. Specific examples of such epoxy group-containing vinyl chloride copolymers include: a vinyl chloride copolymer containing a vinyl chloride repeating unit, an epoxy-containing repeating unit, and optionally a repeating unit having a polar group such as —$SO_3M$, —$OSO_3M$, —COOM and —$PO(OM)_2$ (in which M represents a hydrogen atom or alkaline metal). If combined with an epoxy-containing repeating unit, an epoxy-containing vinyl chloride copolymer having a —$SO_3Na$-containing repeating unit is preferred.

The content of the polar group-containing repeating unit in the copolymer is normally in the range of 0.01 to 5.0 mole %, preferably 0.5 to 3.0 mole %.

The content of the epoxy-containing repeating unit in the copolymer is normally in the range of 1.0 to 30 mole %, preferably 1 to 20 mole %. The above mentioned vinyl chloride polymer contains an epoxy-containing repeating unit in an amount of generally 0.01 to 0.5 mole, preferably 0.01 to 0.3 mole per mole of vinyl chloride repeating unit.

If either the content of the epoxy-containing repeating unit is lower than 1 mole % or the content of the epoxy-containing repeating unit per mole of vinyl chloride repeating unit is less than 0.01 mole, the release of hydrogen chloride gas from the vinyl chloride copolymer may not be effectively inhibited. On the contrary, if either the content of the epoxy-containing repeating unit is higher than 30 mole % or the content of the epoxy-containing repeating unit per mole of vinyl chloride repeating unit is higher than 1 mole, the resulting vinyl chloride copolymer may exhibit a reduced hardness, possibly deteriorating the running durability of the magnetic layer prepared therefrom.

Further, if the content of the repeating unit containing a specific polar group falls below 0.01 mole%, the dispersibility of the ferromagnetic powder may be insufficient. On the contrary, if it exceeds 5.0 mole%, the copolymer becomes hygroscopic and thus may exhibit a deteriotated weatherability.

Such a vinyl chloride copolymer normally has a number-average molecular weight of 15,000 to 60,000.

Such a vinyl chloride copolymer containing an epoxy group and a specific polar group can be prepared as follows.

In the case where a vinyl chloride copolymer comprising an epoxy group and —$SO_3N$ group as a polar group incorporated therein is prepared, sodium 2-(meth)acrylamide-2-methylpropanesulfonate (monomer containing a reactive double bond and a polar group) containing a reactive double bond and —$SO_3Na$ as a polar group and diglycidyl acrylate are mixed at a low temperature, and then polymerized with vinyl chloride at a temperature of 100° C. or lower under pressure.

Examples of the monomer containing a reactive double bond and a polar group to be used in the incorporation of a polar group according to the above mentioned method include 2-(meth)acrylamide-2-methylpropanesulfonic acid, vinylsulfonic acid, sodium or potassium salts thereof, ethyl (meth)acrylic acid-2sulfonate, sodium or potassium salts thereof, (anhydrous) maleic acid, (meth)acrylic acid, and ester (meth)acrylic acid-2-phosphate besides sodium 2-(meth)acrylamide-2-methylpropanesulfonate.

In the incorporation of epoxy group, the monomer containing a reactive double bond and an epoxy group can normally be glycidyl (meth)acrylate.

Besides the above mentioned preparation method, a method can be used which comprises allowing vinyl chloride to undergo a polymerization reaction with vinyl alcohol or the like to prepare a vinyl chloride copolymer containing a multifunctional —OH group, and then allowing the copolymer to undergo reaction (dehydrochorination reaction) with a compound containing a polar group and a chlorine atom given below to introduce the polar group into the copolymer.

$ClCH_2CH_2SO_3M$, $ClCH_2CH_2OSO_3M$, $ClCH_2COOM$, $ClCH_2PO(OM)_2$

In the introduction of epoxy group utilizing this dehydrochlorination reaction, epichlorohydrin may be normally used.

The above mentioned vinyl chloride copolymer may contain other monomers. Examples of such other monomers include vinyl ether (e.g., methyl vinyl ether, isobutyl vinyl ether, lauryl vinyl ether), $\alpha$-monoolefin (e.g., ethylene, propylene), acrylic acid ester (e.g., ester (meth)acrylate containing a functional group such as methyl (meth)acrylate and hydroxyethyl (meth)acrylate), unsaturated nitrile (e.g., (meth)acrylonitrile), aromatic vinyl (e.g., styrene, $\alpha$-methylstyrene), and vinyl ester (e.g., vinyl acetate, vinyl propionate).

Specific examples of these binders to be used in the the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Co., Ltd.; MPR-TA, MPR-TA5, MPR-TAL, MPR-TSN, MPR-TMF, MPR-TS, MPR-TM and MPR-TAO manufactured by Nisshin Chemical Industry Co., Ltd.; 1000W, DX80, DX81, DX82, DX83 and 100FD manufactured by Electro Chemical Industrial Co., Ltd.; MR105, MR110, MR100, and 400X110A manufactured by Nippon Zeon Co., Ltd.; Nippollan N2301, N2302 and N2304 manufactured by Nippon Polyurethane Co., Ltd.; Pandex T-5105, T-R3080 and T-5201, Barnock D-400 and D-210-80, and Crisvon 6109 and 7209 manufactured by Dainippon and Chemicals Inc.; Vylon UR8200, UR8300, UR8600, UR5500, UR4300, RV530 and RV280 manufactured by Toyobo Co., Ltd.; Daipheramine 4020, 5020, 5100, 5300, 9020, 9022 and 7020 manufactured by Dainichi Seika Co., Ltd.; MX5004 manufactured by Mitsubishi Chemical Corporation; Sunprene SP-150 manufactured by Sanyo Chemical Industries Co., Ltd.; and Salan F310 and F210 manufactured by Asahi Chemical Industry Co., Ltd.

The content of the binder resin in the upper magnetic layer of the present invention is normally in the range of 5 to 50% by weight, preferably 10 to 35% by weight based on the weight of ferromagnetic powder. If a vinyl chloride resin is to be used, its content is preferably in the range of 5 to 30% by weight. If a polyurethane resin is to be used, its content is preferably in the range of 2 to 20% by weight. If a polyisocyanate is to be used, its content is preferably in the range of 2 to 20% by weight. These binder resins are preferably used in these amounts in combination.

The total content of the binder resin in the lower non-magnetic layer of the present invention is normally in the range of 5 to 50% by weight, preferably 10 to 35% by weight, based on the weight of nonmagnetic powder. If a vinyl chloride resin is to be used, its content is preferably in the range of 3 to 30% by weight. If a polyurethane resin is to be used, its content is preferably in the range of 3 to 30% by weight. If a polyisocyanate is to be used, its content is preferably in the range of 0 to 20% by weight. These binder resins are preferably used in these amounts in combination.

In the present invention, if an epoxy-containing resin having a molecular weight of 30,000 or more is to be used in an amount of 3 to 30% by weight based on the weight of nonmagnetic powder, resins other than the epoxy-containing resin can be used in an amount of 3 to 30% by weight based on the weight of nonmagnetic powder. If a polyurethane resin is to be used, these resins can be used in an amount of 3 to 30% by weight based on the weight of nonmagnetic powder. If a polyisocyanate is to be used, these resins can be used in an amount of 0 to 20% by weight based on the weight of nonmagnetic powder. The epoxy group is preferably contained in an amount of $4 \times 10^{-5}$ to $16 \times 10^{-4}$ eq/g based on the total weight of binder (including hardener).

In the present invention, if polyurethane is used, its glass transition temperature, breaking extension, breaking stress and yield point are preferably in the range of $-50°$ C. to $100°$ C., 100 to 2,000%, 0.05 to 10 kg/cm$^2$ and 0.05 to 10 kg/cm$^2$, respectively.

The magnetic recording medium of the present invention essentially consists of two layers, but may also consist of three or more layers. In a configuration having three or more layers, the upper magnetic layer consists of two or more, that is, a plurality of magnetic layers. In this case, the concept of an ordinary configuration having a plurality of magnetic layers is applicable to the relationship between the uppermost magnetic layer and the lower magnetic layers. For example, the uppermost magnetic layer can comprise a ferromagnetic powder having a higher coercive force and smaller average length in the long axis and crystallite size than the lower magnetic layers. Alternatively, the lower nonmagnetic layer may consist of a plurality of nonmagnetic layers. Anyway, the magnetic recording medium roughly consists of an upper magnetic layer and a lower nonmagnetic layer.

Accordingly, it goes without saying that the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered from the upper magnetic layer to the lower magnetic layer as is necessary.

Examples of polyisocyanates which can be used in the present invention include isocyanates such as tolylenediisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL manufactured by Nippon Polyurethane Co., Ltd.; Takenate D-102, Takenate D-110N, Takenate D-200 and Takenate D-202 manufactured by Takeda Chemical Industries, Co., Ltd.; and Desmodur L, Desmodur Ill., Desmodur N and Desmodur HL manufactured by Sumitomo Bayer Co., Ltd.; These isocyanates may be used singly. Alternatively, by making the best use of the difference in their hardening reactivity, two or more of these isocyanates can be used in combination in both the upper magnetic layer and lower nonmagnetic layer.

The carbon black to be incorporated into the upper magnetic layer can be furnace black for rubber, thermal black for rubber, black for color, acetylene black, etc. Such carbon black preferably has a specific surface area of 5 to 500 m$^2$/g, DBP oil adsorption of 10 to 400 ml/100 g, average grain diameter of 5 mµ to 300 µ, pH value of 2 to 10, water content of 0.1 to 10%, and tap density of 0.1 to 1 g/ml. Specific examples of carbon black to be used in the present invention include BLACKPEARLS 2000, 1300, 1000, 900, 800, 880, 700, VULCAN and XC-72 produced by Cabot Co., Ltd.; #80, #60, #55, #50, and # 35 produced by Asahi Carbon Co., Ltd.; #2400, #2300, #900, #1000, #30, #40, and #10B produced by Mitsubishi Chemical Corporation; CONDUCTEX SC and RAVEN 150, 50, 40 and 15 produced by Columbia Carbon Co., Ltd. These carbon blacks may be surface-treated with a dispersant, grafted with a resin or partially graphtized before use. These carbon blacks may be previously dispersed in a binder before being added to the nonmagnetic coating solution. These carbon blacks may be used singly or in combination. If carbon black is to be used, its content is preferably in the range of 0.1 to 30% based on the weight of ferromagnetic powder. Carbon black serves to inhibit the electrification of the magnetic layer, reduce the frictional coefficient, provide light screening effect, enhance the film strength, etc. These functions vary with the kind of carbon black used. These carbon blacks may be different in kind, content and combination from the lower layer to the upper layer depending on the previously specified properties such as grain size, oil adsorption, electrical conductivity and pH. For carbon blacks which can be incorporated into the upper layer of the present invention, reference can be made to "Handbook of Carbon Black" Carbon Black Kyokai Specific examples of abrasives to be used in the upper magnetic layer of the present invention include α-alumina having an alpha conversion of 90% or more, β-alumina, silicon carbide, chromium oxide, cerium oxide, α-iron oxide, corundum, aritificial diamond, silicon nitride, silicon carbide, titanium carbide, titanium oxide, silicon dioxide, and boron nitride. In general, known materials having a Mohs' hardness of 6 or more are used singly or in combination. A composite material made of these abrasives (abrasive surface-treated with another abrasive) may be used. These abrasives may contain compounds or elements other than the main component, but exert similar effects provided that the content of the main component is not less than 90%. The grain size of these abrasives is preferably in the range of 0.01 to 2 µm. If necessary, a plurality of abrasives having different grain sizes may be used in combination or a single abrasive having a wide grain diameter distribution may be used to provide similar effects. The tap density of these abrasives is preferably in the range of 0.3 to 2 g/ml. The water content of these abrasives is preferably in the range of 0.1 to 5%. The pH value of these abrasives is preferably in the range of 2 to 11. The specific surface area of these abrasives is preferably in the range of 1 to 30 m$^2$/g. The abrasives to be used in the present invention may be in the form of an acicular, spherical or die-like shape. The abrasives to be used in the present invention may preferably have edges partially on the surface thereof to provide a high abrasion.

Specific examples of abrasives to be used in the present invention include AKP-20A, AKP-30, AKP-50 and HIT-50 manufactured by Sumitomo Chemical Co., Ltd.; G5, G7, and S-1 manufactured by Nippon Chemical Industrial Co., Ltd.; and TF-100, TF-140, 100ED and 140ED manufactured by Toda Kogyo Co., Ltd. The abrasives to be used in the present invention can be varied in kind, content and combination from the lower layer to the upper layer, depending on the purpose. These abrasives may be incorporated into the magnetic coating solution in the form of a dispersion in a binder.

The additives to be used in the present invention can be those having a lubricating effect, an antistatic effect, a dispersing effect, a plasticizing effect, etc. For example, molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, ester alkylphosphate and alkaline metal salt thereof, ester alkylsulfate and alkaline metal salt thereof, polyphenyl ether, fluorine-containing ester alkylsulfate and alkaline metal salt thereof, monoaliphatic ester, dialiphatic ester or trialiphatic ester of monobasic aliphatic acid with 10 to 24 carbon atoms (which may contain an unsaturated bond or may be branched) and salt thereof with metals (e.g., Li, Na, K, Cu), monovalent, divalent, trivalent, tetravalent, pentavalent and hexavalent alcohol with 12 to 22 carbon atoms (which may contain an unsaturated bond or may be branched), alkoxy alcohol with 12 to 22 carbon atoms or monobasic aliphatic acid with 10 to 24 carbon atoms (which may contain an unsaturated bond or may be branched) with one of monovalent, divalent, trivalent, tetravalent, pentavalent and hexavalent alcohols with 2 to 12 carbon atoms (which may contain an unsaturated bond or may be branched), aliphatic ester of monoalkyl ether of alkylene oxide polymer, aliphatic amide with 8 to 22 carbon atoms, aliphatic amine with 8 to 22 carbon atoms, etc., can be used. Specific examples of such additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Further, nonionic surface active agents such as alkylene oxide, glycerin, glycidol and alkylphenolethylene oxide addition product, cationic surface active agents such as cyclic amine, ester amide, quaternary ammonium salt, hydantoin derivative, heterocyclic compound, phosphonium and sulfonium; anionic surface active agents containing polar groups such as carboxylic acid, sulfonic acid, phosphoric acid, ester sulfate and ester phosphate; amphoteric surface active agents such as amino acid, aminosulfonic acid, sulfuric or phosphoric ester of amino alcohol and alkylbetaine, etc., can be used. These surface active agents are further described in "Kaimen Kasseizai Binran (Handbook of Surface Active Agents)", Sangyo Tosho K.K. These lubricants, antistatic agents, etc., need not be necessarily 100% pure, but may contain impurities such as isomer, unreacted material, by-product, decomposition product and oxide. The concentration of these impurities is preferably in the range of 30% or less, more preferably 10% or less.

These lubricants and surface active agents to be used in the present invention may be varied in their kind and content from the lower nonmagnetic layer to the upper magnetic layer as is necessary. For example, aliphatic acids may be varied in their melting points from the lower nonmagnetic layer to the upper magnetic layer to control the oozing thereof to the surface. Esters may be varied in their boiling points or polarity from the lower nonmagnetic layer to the upper magnetic layer to control the oozing thereof to the surface. The content of surface active agents may be controlled to improve the coating stability. The content of a surface active agent in the lower nonmagnetic layer may be higher than that in the upper magnetic layer to improve the lubricating effect. The present invention is not limited to these examples.

The additives to be used in the present invention may be entirely or partially added to the system at any steps during the preparation of the magnetic coating solution. For example, these additives may be mixed with magnetic materials before kneading. Further, these additives may be added to the system at the step of kneading magnetic materials with a binder and a solvent. Alternatively, these additives may be added to the system during or after the dispersion step or immediately before the coating step. Examples of the trade name of these lubricants to be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid manufactured by Nippon Oils And Fats Co., Ltd.; oleic acid manufactured by Kanto Chemical Co., Ltd.; FAL-205 and FAL-123 manufactured by Takemoto Yushi Co., Ltd.; Enujerubu LO, Enujerubu IPM and Sansosyzer E4030 manufactured by Shin Nihon Rika Co., Ltd.; TA-3, KF-96, KF- 96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by The Shin-Etsu Chemical Co., Ltd., Armide P, Armide C, and Armoslip CP manufactured by Lion Armor Co., Ltd.; Duomine TDO manufactured by Lion Fat and Oil Co., Ltd.; BA-41G manufactured by The Nisshin Oil Mills Co., Ltd.; and Profan 2012E, Newpole PE61, Ionet MS-400, Ionet MO-200, Ionet DL-200, Ionet DS-300, Ionet DS-1000, and Ionet DO-200 manufactured by Sanyo Chemical Co., Ltd.

Examples of organic solvents which can be used in the present invention include: ketones, such as acetone, methyl ethyl ketone, methyl isobutyl ketone, diisobutyl ketone, cyclohexanone, isophorone and tetrahydrofuran; alcohols, such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers, such as glycol dimethyl ether, glycol monoethyl ether and dioxane; aromatic hydrocarbons such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene, N,N-dimethylformamide, and hexane. These organic solvents may be used in any proportion. These organic solvents are not necessarily 100% pure and may contain impurities such as isomers, unreacted matters, side reaction products, decomposition products, oxides and water content besides main components. The content of these impurities is preferably in the range of 30% or less, more preferably 10% or less. A solvent having a high surface tension may be used for the lower nonmagnetic layer to enhance the coating stability. Specifically, it is essential that the arithmetic mean of the solvent composition for the upper layer is not smaller than that of the solvent composition for the lower layer.

If necessary, the kind of organic solvents to be used in the present invention may be the same from the upper layer to the lower layer. A solvent having a high surface tension (e.g., cyclohexanone, dioxane) may be used for the lower nonmagnetic layer to enhance the coating stability. Specifically, it is essential that the arithmetic mean of the solvent composition for the upper layer is not smaller than that of the solvent composition for the lower layer. In order to enhance the dispersibility, the polarity of the organic solvent is preferably somewhat high. The solvents to be used for the coating solutions for the lower nonmagnetic layer and the upper magnetic layer, each preferably contains a solvent having a solubility parameter of 8 to 11 and a dielectric constant of 15 or more at 20° C. in an amount of 15% or more.

In the thickness configuration of the magnetic recording medium of the present invention, the thickness of the nonmagnetic support is in the range of generally 1 to 100 µm, preferably 4 to 80 µm, the thickness of the lower nonmagnetic layer is in the range of generally 0.5 to 10 µm, preferably 1 to 5 µm, and the thickness of the upper magnetic layer is in the range of generally 0.05 to 1.0 µm, preferably 0.05 to 0.6 µm, more preferably 0.05 to 0.3 µm. The sum of the thicknesses of the upper layer and the lower layer is in the range of 1/100 to 2 times the thickness of the nonmagnetic support. An undercoating layer may be provided between the nonmagnetic support and the lower layer to enhance the adhesion therebetween. The thickness of the undercoating layer is in the range of generally 0.01 to 2 µm, preferably 0.05 to 0.5 µm. A back coating layer may be provided on the other side of the nonmagnetic support. The thickness of the back coating layer is in the range of generally 0.1 to 2 µm, preferably 0.3 to 1.0 µm. For these undercoating and back coating layers, one can use known materials.

The nonmagnetic support to be used in the present invention can be any known film such as polyester, e.g., polyethylene terepthalate and polyethylene naphthalate, polyolefin, cellulose triacetate, polycarbonate, polyamide, polyimide, polyamide imide, polysulfon, aramide and aromatic polyamide. These support (materials) may be previously subjected to corona discharge, plasma treatment, easy adhesion treatment, heat treatment, dust removing treatment, etc. In order to accomplish the objects of the present invention, it is necessary to use a nonmagnetic support having a center-line average surface roughness of 0.03 µm or less, preferably 0.02 µm or less, more preferably 0.01 µm or less. Such a nonmagnetic support preferably not only has a small average surface roughness on the center line, but also has no big protrusions having a size of 1 µm or more. The shape of the surface roughness may be freely controlled by the size and amount of filler to be incorporated into the support as is necessary. Examples of the filler include oxide and carbonate of Ca, Si, and Ti, and finely divided powder of organic material such as acryl.

The nonmagnetic support to be used in the present invention preferably exhibits F-5 (i.e., the load at the 5% elongation) values of 5 to 50 kg/mm$^2$ in the web running direction and 3 to 30 kg/mm$^2$ in the web width direction. In general, F-5 value in the web lengthwise (web running) direction is higher than F-5 value in the web width direction. However, if the crosswise (web width) strength of the nonmagnetic support needs to be high, the present invention is not limited to this specification.

The nonmagnetic support preferably exhibits a lengthwise (web running direction) and crosswise (web width direction) heat shrinkage of generally 3% or less, more preferably 1.5% or less, at 100° C. for 30 minutes and generally 1% or less, more preferably 0.5% or less, at 80° C. for 30 minutes. The breaking strength of the support is preferably in the range of 5 to 100 kg/mm$^2$ in both directions. The elastic modulus of the support is preferably in the range of 100 to 2,000 kg/mm$^2$ in both directions.

The process for the preparation of the magnetic coating solution for the magnetic layer in the magnetic recording medium of the present invention comprises at least a kneading step, a dispersion step, and a mixing step which is optionally provided before or after these steps. These steps each may consist of two or more stages. The raw materials to be used in the present invention, e.g., ferromagnetic powders, binder resins, nonmagnetic powders, carbon black, abrasives, antistatic agents, lubricants and solvents, may be added to the system at the beginning or during any step. These raw materials each may be batchwise added to the system at two or more steps. For example, polyurethane may be batchwise charged into the system at the kneading step, dispersion step or mixing step for viscosity adjustment after dispersion.

In order to accomplish the objects of the present invention, a known preparation technique can, of course, be used as a step. In the kneading step, an apparatus having a strong kneading power such as continuous kneader and pressure kneader can be used to enhance Br of the magnetic recording medium of the present invention. If a continuous kneader or pressure kneader is used, the magnetic powders are kneaded with the whole or part (preferably 30% by weight or more of the total weight of all binder resins) of the binder in an amount of 15 to 500 parts by weight based on 100 parts by weight of magnetic powders. These kneading techniques are further described in JP-A-1-106388 and JP-A-64-79274. In the preparation of the coating solution of the lower nonmagnetic layer, a dispersion medium having a high specific gravity is preferably used. Zirconia beads and metal beads are suitable.

In the present invention, a simultaneous multi-layer coating method as disclosed in JP-A-62-212933 can be used to give a higher efficiency in the preparation of the magnetic recording medium. Examples of the apparatus and methods for the coating of a magnetic recording medium having a multi-layer structure according to the present invention include the following:

1. Gravure coating method, roll coating method, blade coating method, extrusion coating method or the like that is normally used for a magnetic coating, is employed to provide a lower layer. An upper layer is then coated on the lower layer by means of a support pressure type extrusion coating apparatus as disclosed in JP-B-1-46186, JP-B-60-238179, and JP-B-2-265672 while the lower layer is wet;

2. An upper layer and a lower layer are coated almost simultaneously by means of a coating head having two coating passage slits as disclosed in JP-A-63-88080, JP-A-2-17921, and JP-A-2-265672; and 3. An upper layer and a lower layer are coated almost simultaneously by means of an extrusion coating apparatus with a backup roll as disclosed in JP-A-2-174965.

In order to inhibit the agglomeration of ferromagnetic powder that deteriorates the electro-magnetic characteristics of the magnetic recording medium, a method disclosed in JP-A-62-95174 and JP-A-1-236968 can be used to provide the coating solution inside the coating head with a shearing force. For the viscosity of the coating solution, the range disclosed in Japanese Patent Application No. 1-312659 is preferably satisfied.

In the present invention, the coating of the lower layer on the nonmagnetic support is preferably carried out by the so-called wet-on-wet coating method.

Examples of the wet-on-wet coating method for use in the preparation of the upper layer and the lower layer include the so-called successive coating method, which comprises coating a first layer, and then coating a second layer as soon as possible on the first layer while it is wet, and the coating method which comprises extrusion coating in a multi-layer structure at the same time.

This wet-on-wet coating method can be a magnetic recording medium coating method disclosed in JP-A-61-139929.

In order to obtain a magnetic recording medium according to the present invention, a strong orientation needs to be effected. A solenoid having 1,000 G (Gauss) or more and a cobalt magnet having 2,000 G or more are preferably used in combination. Further, a proper drying process is preferably provided before the orientation step to maximize the orientability after drying. If the present invention is applied to disc medium, an orientation method for randomizing orientation is needed.

As calendering rollar roll, there can be used a roll made of a heat-resistant plastic such as epoxy, polyimide, polyamide and polyimidamide. Only metallic rolls may be used in combination. The processing temperature is preferably in the range of 70° C. or higher, more preferably 80° C. or higher. The linear pressure is preferably in the range of 200 kg/cm, more preferably 300 kg/cm. The calendering rate is in the range of 20 to 700 /min. The effects of the present invention can be further exerted at a temperature of 80° C. or higher and a linear pressure of 300 kg/cm or more.

The magnetic recording medium of the present invention preferably exhibits a frictional coefficient of 0.5 or less, more preferably 0.3 or less, with respect to SUS420J on the upper layer side and the other side. The magnetic layer preferably has an inherent surface resistivity of $1 \times 10^4$ to $1 \times 10^{11}$ Ω/sq. In the configuration wherein the lower layer is singly coated, the inherent surface resistivity is preferably in the range of $1 \times 10^4$ to $1 \times 10^8$ Ω/sq. The back layer preferably has an electrical surface resistivity of $1 \times 10^3$ to $1 \times 10^9$ Ω.

The upper magnetic layer preferably exhibits an elasticity of 300 to 2,000 kg/mm$^2$ at 0.5% elongation in both the web coating (running) direction and the crosswise (width) direction. The breaking strength of the upper magnetic layer is preferably in the range of 2 to 30 kg/cm$^2$. The elasticity of the magnetic recording medium is preferably in the range of 100 to 1,500 kg/mm$^2$ in both the web coating direction and the crosswise direction. The residual elongation of the magnetic recording medium is preferably in the range of 0.5% or less. The heat shrinkage of the magnetic recording medium at all temperatures lower than 100° C. is preferably 1% or less, more preferably 0.5% or less, most preferably 0.1% or less.

The upper layer and the lower layer each preferably has voids of 30 vol % or less, more preferably 20 vol % or less. The voids are preferably small to provide a high output. In some cases, certain voids are preferably secured depending on the purpose. For example, in the case of magnetic recording media for data recording, repeated use of which is particularly needed, the voids are preferably great to provide excellent running durability. These values can be easily defined in proper ranges depending on the purpose.

In the magnetic characteristics of the magnetic recording medium of the present invention measured under a magnetic field of 5 KOe, the squareness ratio is in the range of preferably 0.70 or more, more preferably 0.80 or more, most preferably 0.90 or more in the tape running direction. The squareness ratio in two directions perpendicular to the tape running direction is preferably in the range of 80% or less of that in the tape direction. SFD of the magnetic layer is preferably in the range of 0.6 or less.

The magnetic recording medium of the present invention comprises a lower layer and an upper layer. It can easily be presumed that the physical properties of the magnetic recording medium may be altered from the lower layer to the upper layer. For example, the elasticity of the magnetic layer can be enhanced to improve the running durability thereof, while the elasticity of the nonmagnetic layer can be lower than that of the magnetic layer to improve the contact of the magnetic recording medium with the head.

The magnetic recording medium of the present invention preferably exhibits physical properties in the following ranges.

The magnetic recording medium of the present invention exhibits a Young's modulus of generally 400 to 500 Kg/mm$^2$, preferably 700 to 4,000 Kg/mm$^2$, as measured by a tensile testing machine. The magnetic layer exhibits a Young's modulus of generally 400 to 5,000 Kg/mm$^2$, preferably 700 to 4,000 Kg/mm$^2$, yield stress of generally 3 to 20 Kg/mm$^2$, preferably 3 to 15 Kg/mm$^2$, and yield elongation in tension of generally 0.2 to 8%, preferably 0.4 to 5%.

These properties are associated with ferromagnetic powder, binder, carbon black, inorganic powder and support and thus affect the durability of the magnetic recording medium.

The bending stiffness (loop stiffness) of the magnetic recording medium of the present invention is preferably in the range of 40 to 300 mg if the total thickness thereof is greater than 11.5 µm, 20 to 90 mg if the total thickness thereof is in the range of 10.5±1 µm, and 10 to 70 mg if the total thickness thereof is smaller than 9.5 µm.

These properties are associated mainly with support and thus are important for securing durability.

The frequency of cracking in the magnetic recording medium of the present invention measured at 23° C. and 70% RH is preferably in the range of 20% or less.

As measured by an X-ray photoelectron spectrometer, the magnetic recording medium of the present invention preferably exhibits Cl/Fe spectrum α of 0.3 to 0.6 and N/Fe spectrum β of 0.03 to 0.12 on the surface of the magnetic layer.

These properties are associated with ferromagnetic powder, inorganic powder and binder and thus are important for securing durability.

When the magnetic recording medium of the present invention is measured by a dynamic viscoelastometer, the magnetic layer preferably exhibits a glass transition temperature Tg (maximal point of loss elastic modulus in dynamic viscoelasticity measured at 110 Hz) of 40° to 120° C., a storage elastic modulus E' (50° C.) of $0.8 \times 10^{11}$ to $11 \times 10^{11}$ dyne/cm$^2$, and a loss elastic modulus E" (50° C.) of $0.5 \times 10^{11}$ to $8 \times 10^{11}$ dyne/cm$^2$. The magnetic layer preferably exhibits a dissipation factor of 0.2 or less. If the dissipation factor is too great, adhesive failure can easily occur. These properties are associated with binder, carbon black and solvent and thus are important properties affecting durability.

The adhesive strength between the nonmagnetic support and the magnetic layer is preferably in the range of 10 g or more as measured under 180° tension by a 8-mm wide tape at 23° C. and 70% RH.

The surface of the upper magnetic layer preferably exhibits a ball abrasion of $0.7 \times 10^{-7}$ to $5 \times 10^{-7}$ m$^3$ at 23° C. and 70% RH. This gives a direct indication of the abrasion of the surface of the magnetic layer and is a measure of durability associated mainly with ferromagnetic powder.

When five copies of electron microphotograph of the magnetic recording medium of the present invention taken by a scanning electron microscope at a ×50,000 magnification are visually checked, the number of abrasive grains on the surface of the magnetic layer is preferably $0.1/\mu m^2$ or more. The number of abrasive grains on the edge surface of the upper magnetic layer in the magnetic recording medium of the present invention is preferably $5/100 \ \mu m^2$ or more. These properties are affected by the abrasive and the binder in the magnetic layer and thus are measures affecting durability.

When the magnetic recording medium of the present invention is subjected to gas chromatography, the amount of residual solvents in the magnetic recording medium is preferably in the range of 50 mg/m$^2$ or less.

The amount of residual solvents in the upper layer is preferably in the range of 50 mg/m$^2$ or less, more preferably 10 mg/m$^2$. The amount of residual solvents in the upper layer is preferably less than that of the lower layer.

The sol fraction, i.e., ratio of soluble solid content extracted from the magnetic recording medium of the present invention with THF to the weight of the magnetic layer, is preferably in the range of 15% or less. This is affected by the ferromagnetic powder and the binder and thus is a measure of durability.

The present invention will be further described in the following examples, but the present invention should not be construed as being limited thereto.

EXAMPLE 1

The coating solutions for the upper magnetic layer and the lower nonmagnetic layer were prepared in accordance with the following formulation.

| Coating solution for lower nonmagnetic layer | |
| --- | --- |
| Inorganic powder TiO$_2$ | 80 parts |
| Average grain diameter: 0.035 μm | |
| Crystallite system: rutile | |
| TiO$_2$ content: 90% by weight | |
| Surface-treated layer | |
| on inorganic powder: Al$_2$O$_3$ (10% by weight) | |
| Specific surface area by BET method: 40 m$^2$/g | |
| DBP oil adsorption: 27–38 g/100 g | |
| pH: 7 | |
| Carbon black | 20 parts |
| Average grain diameter: 16 mμ | |
| DBP oil adsorption: 80 ml/100 g | |
| pH: 8.0 | |
| Specific surface area by BET method: 250 m$^2$/g | |
| Volatile content: 1.5% | |
| Vinyl chloride-vinyl acetate-vinyl | 12 parts |
| alcohol copolymer (86:13:1; | |
| containing a polar group —N(CH$_3$)$_3$$^{+Cl-}$; | |
| polymerization degree: 400) | |
| Polyester polyurethane resin | 5 parts |
| (neopentyl glycol/caprolactone polyol/ | |
| MDI = 0.9/2.6/1; containing —SO$_3$Na group | |
| in an amount of $1 \times 10^{-4}$ eq/g) | |
| Butyl stearate | 1 part |
| Stearic acid | 1 part |
| Methyl ethyl ketone | 100 parts |
| Cyclohexanone | 50 parts |
| Toluene | 50 parts |
| Coating solution for upper magnetic layer | |
| Finely divided ferromagnetic powder | 100 parts |
| (composition: Fe/Zn/Ni = 92/4/4) | |
| Hc: 1,600 Oe | |
| Specific surface area by BET method: 60 m$^2$/g | |
| Crystallite size: 195 Å | |
| Average length in the long axis: 0.20 μm | |
| Acicular ratio: 10 | |
| Saturated magnetization (θs): 130 emu/g | |
| Surface-treating agent: Al$_2$O$_3$, SiO$_2$ | |
| Vinyl chloride copolymer (contain- | 12 parts |
| ing —SO$_3$Na group in an amount of | |
| $1 \times 10^{-4}$ eq/g; polymerization degree: 300) | |
| Polyester polyurethane resin | 3 parts |
| (neopentyl/caprolactone polyol/MDI = | |
| 0.9/2.6/1; containing —SO$_3$Na group | |
| in an amount of $1 \times 10^{-4}$ eq/g) | |
| α-Alumina | 2 parts |
| (average grain diameter: 0.3 μm) | |
| Carbon black | 0.5 parts |
| (average grain diameter: 0.10 μm) | |
| Butyl stearate | 1 part |
| Stearic acid | 2 parts |
| Methyl ethyl ketone | 90 parts |
| Cyclohexanone | 50 parts |
| Toluene | 60 parts |

For the two coating solutions, the respective components were kneaded by means of a continuous kneader and then dispersed by means of a sand mill. To the dispersions thus obtained were added a polyisocyanate in an amount of 1 part for the coating solution for the lower nonmagnetic layer, 3 parts for the coating solution for the upper magnetic layer, and butyl acetate in an amount of 40 parts for each coating solution. The materials were each filtered through a filter having an average pore diameter of 1 μm to prepare the coating solutions for the lower nonmagnetic layer and the upper magnetic layer.

The coating solution for the lower nonmagnetic layer and the coating solution for the upper magnetic layer were subjected to simultaneous multi-layer coating. Specifically, the coating solution for the lower nonmagnetic layer was coated on a 7-μm thick polyethylene terephthalate support having a center-line average surface roughness of 0.01 μm to a dry thickness of 2 μm, and the coating solution for the upper magnetic layer was immediately coated thereon to a dry thickness of 0.5 μm. While the two layers were wet, the material was oriented under a cobalt magnet having a magnetic force of 3,000 G and a solenoid having a magnetic force of 1,500 G. After being dried, the material was then treated through a 7-stage calender made of only metal rolls at a temperature of 90° C. The material was then slit into 8-mm wide strips to prepare a 8-mm video tape of Example 1-1.

Further, specimens of Examples 1-2 to 1-12 and Comparative Examples 1-1 to 1-3 were prepared in the same manner as in Example 1-1 except that the factors set forth in Tables 1-1 to 1-2 were altered. The properties of these specimens were similarly evaluated. The results are set forth in Tables 1-1 to 1-2.

Center-line average surface roughness (Ra) was measured at cutoff value of 0.25 mm by means of a three-dimensional surface roughness meter (manufactured by Kosaka Kenkyusho).

Electro-magnetic characteristics 1. 7 MHz output: Using a 8-mm video deck (FUJIX8 manufactured by Fuji Photo Film Co., Ltd.), a 7 MHz signal was recorded on the specimen. The recorded 7 MHz signal was then reproduced from the specimen. The output was measured by an oscilloscope. The control was SAG P6-120 (8-mm tape manufactured by Fuji Photo Film Co., Ltd.).

2. C/N: Using a 8-mm video deck (FUJIX8 manufactured by Fuji Photo Film Co., Ltd.), a 7 MHz signal was recorded on the specimen. When the recorded 7 MHz signal was reproduced from the specimen, noise generated at 6 MHz was measured by a spectrum analyzer. The ratio of the noise to the reproduced signal was determined.

magnetic characteristics. Comparative Specimen 1-1, which is free of an inorganic oxide on the inorganic powder, exhibits poor dispersibility, high Ra and σ, and poor electromagnetic characteristics. Comparative Specimen 1-2, which

TABLE 1-1

| | Examples | | | | | | |
|---|---|---|---|---|---|---|---|
| | 1-1 | 1-2 | 1-3 | 1-4 | 1-5 | 1-6 | 1-7 |
| Lower layer treated | | | | | | | |
| Inorganic powder | $TiO_2$ Rutile | $TiO_2$ Rutile | $TiO_2$ Rutile | $TiO_2$ Rutile | $TiO_2$ Rutile | $TiO_2$ Rutile | $TiO_2$ Rutile |
| $Al_2O_3$ (wt %) | 10 | 0 | 0 | 5 | 5 | 0 | 5 |
| $SiO_2$ (wt %) | 0 | 5 | 0 | 3 | 0 | 1 | 3 |
| $ZrO_2$ (wt %) | 0 | 0 | 5 | 0 | 1 | 1 | 0.5 |
| Main component (wt %) | 90 | 90 | 91 | 90 | 88 | 91 | 85 |
| Proportion of $Al_2O_3$ | 1.000 | 0.000 | 0.000 | 0.625 | 0.833 | 0.000 | 0.588 |
| Thickness of lower layer (μm) | 2.5 | 2.5 | 2.5 | 2.5 | 2.5 | 2.5 | 2.5 |
| Upper layer | | | | | | | |
| Thickness of magnetic layer (μm) | 0.5 | 0.5 | 0.5 | 0.5 | 0.5 | 0.5 | 0.5 |
| θ (μm) | 0.09 | 0.10 | 0.08 | 0.06 | 0.05 | 0.11 | 0.15 |
| Coating method | Simultaneous multi-layer coating method | | | | | | |
| Surface roughness (nm) | 3.5 | 3.3 | 4.1 | 3.5 | 3.2 | 3.7 | 3.3 |
| Electro-magnetic characteristics | | | | | | | |
| 7 MHz output (dB) | 6.5 | 6.6 | 5.5 | 6.6 | 6.7 | 6.3 | 6.4 |
| C/N | 6.1 | 6 | 5.9 | 6 | 5.9 | 6.1 | 6.1 |

TABLE 1-2

| | Examples | | | | | | | |
|---|---|---|---|---|---|---|---|---|
| | Comparative 1-1 | 1-8 | Comparative 1-2 | Comparative 1-3 | 1-9 | 1-10 | 1-11 | 1-12 |
| Lower layer treated | | | | | | | | |
| Inorganic powder | $TiO_2$ Rutile | $TiO_2$ Rutile | $TiO_2$ Rutile | $TiO_2$ Rutile | $TiO_2$ Anatase | α-hematite | $BaSO_4$ | ZnO |
| $Al_2O_3$ (wt %) | 0 | 10 | 10 | 10 | 10 | 8 | 5 | 5 |
| $SiO_2$ (wt %) | 0 | 0 | 0 | 0 | 0 | 2 | 5 | 3 |
| $ZrO_2$ (wt %) | 0 | 0 | 0 | 0 | 0 | 0 | 0 | 0 |
| Main component (wt %) | 98 | 90 | 90 | 90 | 90 | 90 | 90 | 90 |
| Proportion of $Al_2O_3$ | 0.000 | 1.000 | 1.000 | 1.000 | 1.000 | 0.800 | 0.500 | 0.625 |
| Thickness of lower layer (μm) | 2.5 | 2.5 | 2.5 | 2.5 | 2.5 | 2.5 | 2.5 | 2.5 |
| Upper layer | | | | | | | | |
| Thickness of magnetic layer (μm) | 0.5 | 1 | 1.2 | 0.5 | 1 | 0.5 | 0.5 | 0.5 |
| θ (82 m) | 0.22 | 0.35 | 0.41 | — | 0.11 | 0.06 | 0.06 | 0.05 |
| Coating method | Simultaneous multi-layer coating method except Comparative Example 1-3 (successive multi-layer coating method) | | | | | | | |
| Surface roughness (nm) | 6.2 | 3.6 | 3.6 | No specimens | 3.5 | 3.2 | 3.9 | 3.3 |
| Electro-magnetic characteristics | | | | | | | | |
| 7 MHz output (dB) | 2.5 | 5.7 | 4.5 | | 6 | 5.9 | 5.8 | 6 |
| C/N | 2.1 | 5.9 | 3.8 | | 5.8 | 5.5 | 5.5 | 6 |

The data in these tables show that the specimens according to the present invention, which are coated with an inorganic oxide of $Al_2O_3$, $SiO_2$, $ZrO_2$ or the like, exhibit an improved dispersibility, a reduced Ra and excellent electromagnetic characteristics. Comparative Specimen 1-2, which comprises a thick magnetic layer, exhibits poor electromagnetic characteristics. Comparative Specimen 1-3, which is subjected to a successive multi-layer coating method, could give no specimens.

EXAMPLE 2

The coating solutions for the upper magnetic layer and the lower nonmagnetic layer were prepared in accordance with the following formulation.

EXAMPLE 2-1

Coating solution for lower nonmagnetic layer: Same as in Example 1-1

| Coating solution for upper magnetic layer | |
| --- | --- |
| Co-substituted barium ferrite<br>Specific surface area by BET method: 35 m²/g<br>Average grain diameter: 0.06<br>Tabular ratio: 5 | 100 parts |
| Vinyl chloride copolymer (containing<br>—$SO_3Na$ group in an amount of $1 \times 10^{-5}$ eq/g;<br>polymerization degree: 300) | 9 parts |
| Finely divided abrasive grains<br>($Cr_2O$; average grain diameter: 0.3 μm) | 7 parts |
| Toluene | 30 parts |
| Methyl ethyl ketone | 30 parts |

These components were kneaded by a kneader for about 1 hour. The following components were added to the material. The mixture was then subjected to dispersion by a kneader for about 2 hours.

| | |
| --- | --- |
| Polyester polyurethane resin<br>(Neopentyl glycol/caproclactone polyol/<br>MDI = 0.9/2.6/1; containing —$SO_3Na$ group<br>in an amount of $1 \times 10^{-4}$ eq/g; average<br>molecular weight: 35,000) | 5 parts |
| Methyl ethyl ketone | 200 parts |
| Cyclohexanone | 100 parts |
| Toluene | 100 parts |

To the material were then added the following carbon black and coarse grain abrasive materials. The mixture was then subjected to dispersion by a sand grinder at 2,000 rpm for about 2 hours.

| | |
| --- | --- |
| Carbon black (average grain diameter:<br>20–30 mμ; Ketjen Black EC<br>(manufactured by Lion Agzo Co., Ltd.)) | 5 parts |
| Coarse abrasive (α-alumina; AKP-12<br>manufactured by Sumitomo Chemical Co.,<br>Ltd.; average grain diameter: 0.5 μm) | 2 parts |

To the dispersion thus obtained were then added the following compositions. The mixture was then subjected to dispersion by a sand grinder to prepare a coating solution for the upper magnetic layer.

| | |
| --- | --- |
| Polyisocyanate (Coronate L manufactured<br>by Nippon Polyurethane Co., Ltd.) | 6 parts |
| Tridecyl stearate | 6 parts |

Onto a 75-μm thick polyethylene terephthalate support was coated the above mentioned lower nonmagnetic layer coating solution to a dry thickness of 2 μm. The magnetic layer coating solutions was then coated on the lower nonmagnetic layer to a dry thickness of 0.5 μm while the lower layer was wet. The other side of the support was similarly treated. The material was then subjected to calendering to prepare a magnetic recording medium. The material was then punched to a 3.5 inch size piece. The material was then put into a 5-inch cartridge having a liner provided thereinside. Predetermined mechanical parts were then added to the material to obtain a 3.5-inch floppy disc of Example 2-1. Specimens 2-2 to 2-7, and Comparative Specimen 2-1 were prepared in the same manner as in Example 2-1, except that the factors were altered as set forth in Table 2. The properties of these specimens were then evaluated. The results are set forth in Table 2.

Initial 2F output:
calculated relative to the output of Specimen 2-1 as 100. The drive used is PD211 (manufactured by Toshiba Corporation).

TABLE 2

| | Examples | | | | | | | Comparative |
| --- | --- | --- | --- | --- | --- | --- | --- | --- |
| | 2-1 | 2-2 | 2-3 | 2-4 | 2-5 | 2-6 | 2-7 | 2-1 |
| Lower layer treated | | | | | | | | |
| Inorganic powder | $TiO_2$ Rutile | $TiO_2$ Rutile | $TiO_2$ Rutile | $TiO_2$ Rutile | $TiO_2$ Rutile | $TiO_2$ Rutile | $TiO_2$ Rutile | $TiO_2$ Rutile |
| $Al_2O_3$ (wt %) | 10 | 0 | 0 | 5 | 5 | 0 | 5 | 0 |
| $SiO_2$ (wt %) | 0 | 5 | 0 | 3 | 0 | 1 | 3 | 0 |
| $ZrO_2$ (wt %) | 0 | 0 | 5 | 0 | 1 | 1 | 0.5 | 0 |
| Main component (wt %) | 90 | 90 | 91 | 90 | 88 | 91 | 85 | 98 |
| Proportion of $Al_2O_3$ | 1.000 | 0.000 | 0.000 | 0.625 | 0.833 | 0.000 | 0.588 | 0.000 |
| Thickness of lower layer (μm) | 2.5 | 2.5 | 2.5 | 2.5 | 2.5 | 2.5 | 2.5 | 2.5 |
| Upper layer | | | | | | | | |
| Thickness of magnetic layer (μm) | 0.5 | 0.5 | 0.5 | 0.5 | 0.5 | 0.5 | 0.5 | 0.5 |
| θ (μm) | 0.09 | 0.06 | 0.07 | 0.05 | 0.08 | 0.07 | 0.06 | 0.25 |
| Coating method | Simultaneous multi-layer coating method | | | | | | | method |
| Surface roughness (nm) | 4.7 | 4.5 | 5.3 | 4.7 | 4.4 | 4.9 | 4.5 | 7.4 |

TABLE 2-continued

| | Examples | | | | | | | Comparative |
|---|---|---|---|---|---|---|---|---|
| | 2-1 | 2-2 | 2-3 | 2-4 | 2-5 | 2-6 | 2-7 | 2-1 |
| Electro-magnetic characteristics | | | | | | | | |
| Initial 2F output | 100 | 98 | 103 | 95 | 96 | 101 | 102 | 86 |

The data in table 2 shows that the specimens according to the present invention, which are coated with an inorganic oxide of $Al_2O_3$, $SiO_2$, $ZrO_2$ or the like on the surface of the inorganic powder, exhibit an improved dispersibility, a reduced Ra and excellent electro-magnetic characteristics. Comparative Specimen 2-1, which is free of an inorganic oxide on the inorganic powder, exhibits a poor dispersibility, high Ra and σ, and poor electro-magnetic characteristics.

EXAMPLE 3

The nonmagnetic support was a polyethylene terephthalate (thickness: 10 μm; F5 value: 20 kg/mm² in MD direction, 14 kg/mm² in TD direction; Young's modulus: 750 kg/mm² in MD direction, 470 kg/mm² in TD direction) or polyethylene terenaphthalate (thickness: 7 μm; F5 value: 22 kg/mm² in MD direction, 18 kg/mm² in TD direction; Young's modulus: 750 kg/mm² in MD direction, 750 kg/mm² in TD direction). The following compositions were then stirred by a disper agitator for 12 hours to prepare an undercoating solution.

| | |
|---|---|
| Polyester resin (containing —$SO_3Na$ group; Tg: 65° C.; Na content: 4,600 ppm) | 100 parts |
| Cyclohexanone | 9,900 parts |

The undercoating solution thus obtained was coated on the nonmagnetic support by means of a bar coater to a dry thickness of 0.1 μm.

On the other hand, an upper magnetic layer coating solution and a lower nonmagnetic layer coating solution were prepared according to the following formulations:

| Coating solution for upper magnetic layer | |
|---|---|
| Ferromagnetic powder: Fe alloy powder (Fe—Co—Ni) Composition: Fe:Co:No:Ni = 92:6:2 Sintering inhibitor: $Al_2O_3$ Hc: 1,600 Oe θs: 119 emu/g Length in the long axis: 0.13 μm Acicular ratio: 7 Crystallite size: 172 Å Water content: 0.6% by weight | 100 parts |
| Vinyl chloride copolymer (containing —$SO_3Na$ in an amount of $8 \times 10^{-5}$ eq/g; containing —OH and epoxy group; Tg: 71° C.; polymerization degree: 300; number-average molecular weight (Mn): 12,000; weight-average molecular weight (Mw): 38,000) | 13 parts |
| Polyurethane resin (containing —$SO_3Na$ in an amount of $8 \times 10^{-5}$ eq/g and —OH group in an amount of $8 \times 10^{-5}$ eq/g; Tg: 38° C.; Mw: 50,000) | 5 parts |

-continued

| Coating solution for upper magnetic layer | |
|---|---|
| α-Alumina (average grain diameter: 0.15 μm; $S_{BET}$: 8.7 m²/g; pH: 8.2; water content: 0.06% by weight) | 12 parts |
| Cyclohexanone | 150 parts |
| Methyl ethyl ketone | 150 parts |

These components were dispersed in an admixture by a sand mill for 6 hours. To the dispersion thus-obtained were added 5 parts of oleic acid, 7 parts of stearic acid and 15 parts of butyl stearate, to prepare a coating solution for the upper magnetic layer.

| Coating solution for lower nonmagnetic layer | |
|---|---|
| $TiO_2$ Average grain diameter: 0.035 μm Crystallite system: Rutile $TiO_2$ content: 90% or more Surface layer: $Al_2O_3$ (10 wt %) $S_{BET}$: 35–45 m²/g True specific gravity: 4.1 pH: 6.5–8.0 | 85 parts |
| Carbon black Average grain diameter: 16 μm DBP oil adsorption: 80 ml/100 g pH: 8.0 $S_{BET}$: 250 m²/g Coloring power: 143% | 5 parts |
| Vinyl chloride copolymer (containing —$SO_3Na$ in an amount of $8 \times 10^{-5}$ eq/g; containing —OH and epoxy group; Tg: 71° C.; polymerization degree: 300; number-average molecular weight (Mn): 12,000; weight-average molecular weight (Mw): 38,000) | 13 parts |
| Polyurethane resin (containing —$SO_3Na$ in an amount of $8 \times 10^{-5}$ eq/g and —OH group in an amount of $8 \times 10^{-5}$ eq/g; Tg: 38° C.; Mw: 50,000) | 5 parts |
| Cyclohexane | 100 parts |
| Methyl ethyl ketone | 100 parts |

These components were dispersed in an admixture by a sand mill for 4 hours. To the dispersion thus obtained were added 5 parts of polyisocyanate (Coronate L), 5 parts of oleic acid, 5 parts of stearic acid and 15 parts of butyl stearate, to prepare a coating solution for the lower nonmagnetic layer.

The two coating solutions were wet-on-wet coated by means of two doctors having different gaps. The coating material was oriented under a permanent magnet of 3,500 G and a solenoid of 1,600 G, and then dried. The material was then subjected to supercalendering between a pair of metallic rolls at a temperature of 80° C. In the coat material, the thicknesses of the magnetic layer and the nonmagnetic layer were 0.3 μm and 3.0 μm, respectively.

A coating solution was prepared according to the following formulation:

| BC layer | |
| --- | --- |
| Carbon black<br>$S_{BET}$: 220 m²/g<br>Average grain diameter: 17 mμ<br>DBP oil adsorption: 75 ml/100 g<br>Volatile content: 1.5%<br>pH: 8.0<br>Bulk density: 15 lbs/ft³ | 100 parts |
| Nitrocellulose (RS1/1) | 100 parts |
| Polyester polyurethane (Nipplan manufactured by Nippon Polyurethane Co., Ltd.) | 30 parts |
| Dispersant | |
| Copper oleate | 10 parts |
| Copper phthalocyanine | 10 parts |
| Barium sulfate (precipitable) | 5 parts |
| Methyl ethyl ketone | 500 parts |
| Toluene | 500 parts |

These compositions were previously kneaded and then kneaded by a roll mill. To 100 parts by weight of the dispersion were added the following compositions:

| | |
| --- | --- |
| Carbon black<br>$S_{BET}$: 200 m²/g<br>Average grain diameter: 200 mμ<br>DBP oil adsorption: 36 ml/100 g<br>pH: 8.5 | 100 parts |
| α-Al₂O₃ (average grain diameter: 0.2 μm) | 0.1 part |

The mixture was subjected to dispersion by a sand grinder. After filtration, to 100 parts by weight of the dispersion were added the following compositions:

| | |
| --- | --- |
| Methyl ethyl ketone | 120 parts |
| Polyisocyanate | 5 parts |

The coating solution thus-obtained was coated on the opposite side of the nonmagnetic support by means of a bar coater to a dry thickness of 0.5 μm. The coating material was slit into 8-mm wide strips. Thus, Specimen 1 (PET support) and Specimen 2 (PEN support) were prepared in the form of 8-mm video tape.

The 8-mm video tapes thus-obtained were then measured for the following properties:
(1) TEM (transmission electron microscope)

An ultrathin section of the magnetic layer was observed under a transmission electron microscope.

The magnetic recording medium was cut into a specimen having a thickness of about 0.1 μm by a diamond cutter. The specimen was observed and photographed under the transmission electron microscope. On the photograph, the interface between the upper layer and the lower layer and the surface of the magnetic layer were edged, and the thickness of the magnetic layer was then measured by an image processor IBAS II. From these measurements, the average value d and the standard deviation σ were determined.

The average value d of the thickness of the magnetic layer was 0.45 μm. It was found that the practical average value d is preferably in the range of 1 μm or less, particularly 0.6 μm or less. The standard deviation σ of the fluctuations of the thickness of the magnetic layer was 0.008 μm or less. It was found that the practical standard deviation σ is preferably in the range of 0.02 μm or less, particularly 0.01 μm or less.

The magnetic tape was stretched to make the magnetic layer free from the support. The magnetic layer was then peeled off the support with a cutter blade. Then 500 mg of the magnetic layer thus-peeled was refluxed in 100 ml of a 1N methanol solution of NaOH to hydrolyze the binder. Since the ferromagnetic powder has a great specific gravity, it sank to the bottom. The supernatant solution was then removed.

The ferromagnetic powder was washed with water three times by decantation, and then washed with THF three times. The ferromagnetic powder thus-obtained was then dried at a temperature of 50° C. in a vacuum dryer. The ferromagnetic powder was then dispersed in collodion. The dispersed ferromagnetic powder was then observed under a transmission electron microscope. The ferromagnetic grains were found to have a length in the long axis of 0.13 μm and an acicular ratio of 10. It was found that the practical length in the long axis needs to be 0.4 μm or less, preferably 0.3 μm or less, and the practical acicular ratio needs to be in the range of 2 to 20, preferably 2 to 15.
(2) AFM (Atomic Force Micro Scope)

The surface roughness $R_{rms}$ was measured. The surface of the magnetic layer was scanned by Nanoscopell manufactured by Digital Instrument Inc. within a zone of 6 μm×6 μm at a tunnel current of 10 nA and a bias voltage of 400 mV. For the surface roughness, $R_{rms}$ in this zone was determined.

As a result, $R_{rms}$ was 6 nm. It was found that the practical $R_{rms}$ needs to be 10 nm or less, preferably 8 nm or less.
(3) Surface roughness meter The surface roughness was measured by 3d-MIRAU. Using TOPO3D manufactured by WYKO, Ra, $R_{rms}$ and peak-valley value in a zone of about 250 mm×250 mm were measured by MIRAU method. Spherical surface correction and cyclinder correction were conducted at a measurement wavelength of about 650 nm. This is a non-contact surface roughness meter which operates with light interference. Ra was 2.7 nm. It was found that the practical Ra is preferably in the range of 1 to 4 nm, more preferably 2 to 3.5 nm. $R_{rms}$ was 3.5 nm. It was found that the practical $R_{rms}$ is preferably in the range of 1.3 to 6 nm, more preferably 1.5 to 5 nm. P-V value was 20 to 30 nm. It was found that the practical P-V value is preferably in the range of 80 nm or less, more preferably 10 to 60 nm.
(4) VSM (vibrating specimen type magnetometer)

The magnetic tape was measured for the magnetic characteristics of the magnetic layer by a vibrating specimen type magnetometer manufactured by Toei Kogyo K.K. at Hm of 5 kOe.

As a result, Hc was 1,620 Oe, Hr (90°) was 1,800 Oe, Br/Bm was 0.82, and SFD was 0.583. It was found that the practical Hc needs to be in the range of 1,500 to 2,500 Oe, preferably 1,600 to 2,000 Oe. It was also found that the practical Hr (90°) needs to be in the range of 1,000 to 2,800 Oe, preferably 1,200 to 2,500 Oe. It was further found that the practical Br/Bm needs to be in the range of 0.75 or more, preferably 0.8 or more. It was further found that the practical SFD needs to be in the range of 0.7 or less, preferably 0.6 or less.
(5) X-ray diffraction The ferromagnetic powder extracted from the magnetic layer in the test (1) was subjected to X-ray diffraction.

The magnetic tape was directly subjected to X-ray diffraction. From the spread of the half value width of diffraction line between (4,4,0) plane and (2,2,0) plane, the crystallite size was determined. As a result, the crystallite size was 180 Å. It was found that the practical crystallite size is preferably in the range of 400 Å or less, particularly 100 to 300 Å.

(6) Tensile test

The magnetic tape was measured for Young's modulus, yield stress and yield elongation in tension by a tensile testing machine (universal tensile testing machine STM-T-50B manufactured by Toyo Baldwin Co., Ltd.) at a pulling rate of 10%/min. in an atmosphere of 23° C. and 70% RH.

The magnetic tape showed a Young's modulus of 1,200 kg/mm$^2$ at an elongation of 0.5%, a yield stress of 6 to 7 kg/mm$^2$, and a yield elongation in tension of 0.8%. The practical Young's modulus at an elongation of 0.5% is preferably in the range of 400 to 2,000 kg/mm$^2$, more preferably 500 to 1,500 kg/mm$^2$. It was also found that the practical yield stress is preferably in the range of 3 to 20 kg/mm$^2$, particularly 4 to 14 kg/mm$^2$. It was further found that the practical yield elongation in tension is preferably in the range of 0.2 to 8%, particularly 0.4 to 5%.

(7) Bending rigidity, loop stiffness

A loop specimen was prepared from a 8-mm wide and 50-mm long specimen. The loop specimen was then measured by a loop stiffness tester for the force (mg) required to give a deformation of 5 mm at a deformation rate of about 3.5 mm/sec.

As a result, the 8-mm p6-120 tape had a thickness of 10.5 μm and showed a stiffness of 40 to 60 mm. It was found that the practical stiffness is preferably in the range of 20 to 90 mg, particularly 30 to 70 mg if the thickness of the tape is within 10.5±1 μm. It was also found that the practical stiffness is preferably in the range of 40 to 200 mg if the thickness of the tape is 11.5 μm or more. It was further found that the practical stiffness is preferably in the range of 10 to 70 mg if the thickness of the tape is 9.5 μm or less.

(8) Tensile breakage

The frequency of cracking was measured at 23° C. and 70% RH.

A 10-cm long tape specimen was observed under microscope at ×400 magnification for the frequency of 5 or more evident cracks occurring on the surface of the magnetic layer while it was being pulled from both ends at a pulling rate of 0.1 mm/sec.

The frequency of cracking was 4%. It was found that the practical frequency of cracking is preferably in the range of 20% or less, particularly 10% or less.

(9) Heat shrinkage

After being stored at a temperature of 70° C. for 48 hours, the magnetic tape was measured for heat shrinkage.

The specimen was stored in a 70° C. constant temperature bath for 48 hours. The change in the length from before to after storage was divided by the initial length to determine the heat shrinkage.

Heat shrinkage was 0.2%. It was found that the practical heat shrinkage is preferably in the range of 0.4% or less, particularly 0.1 to 0.3%.

(10) ESCA

Cl/Fe spectrum α and N/Fe spectrum β were measured.

For the measurement of α and β, an X-ray photoelectron spectrometer (produced by PERKIN-FLMER Co., Ltd.). An X-ray source was used an Mg anode. The measurement was conducted at 300 W. The lubricant contained in the video tape was washed away with n-hexane. The video tape was then mounted in the X-ray photoelectron spectrometer. The distance between the X-ray source and the specimen was 1 cm. The specimen system was evacuated to vacuum. After 5 minutes, C1-2P spectrum, N-1S spectrum, and Fe-2P(3/2) spectrum were integrated and measured for 10 minutes. The bath energy was maintained at 100 eV. The integrated intensity ratio of C1-2P spectrum to Fe-2P(3/2) spectrum was calculated to determine α.

Further, the integrated intensity ratio of N-1S spectrum to Fe-2P(3/2) spectrum was calculated to determine β.

As a result, α was 0.45, and β was 0.07. It was found that the practical α is preferably in the range of 0.3 to 0.6, particularly 0.4 to 0.5. It was also found that the practical β is preferably in the range of 0.03 to 0.12, particularly 0.04 to 0.1.

(11) Rheovibron

Using a dynamic viscoelastometer (Rheovibron manufactured by Toyo Baldwin Co., Ltd.), the video tape was measured for viscoelasticity at a frequency of 110 Hz. Tg is defined as the peak temperature of E". In this testing method, a vibration was applied to the tape from one end, and the vibration transmitted to the other end was measured.

Tg was 73° C., E' (50° C.) was $4 \times 10^{10}$ dyne/cm$^2$, and E" (50° C.) was $1 \times 10^{11}$. It was found that the practical Tg is preferably in the range of 40 to 120° C., particularly 50 to 110° C. It was also found that the practical E' (50° C.) is preferably in the range of $0.8 \times 10^{11}$ to $11 \times 10^{11}$ dyne/cm$^2$, particularly $1 \times 10^{11}$ to $9 \times 10^{11}$ dyne/cm$^2$. It was further found that the practical E" (50° C.) is preferably in the range of $0.5 \times 10^{11}$ to $8 \times 10^{11}$ dyne/cm$^2$, particularly $0.7 \times 10^{11}$ to $5 \times 10^{11}$ dyne/cm$^2$.

(12) Adhesive strength

The adhesive strength between the support and the magnetic layer was measured by 180° peeling method.

A 8-mm wide test specimen slit from the video tape was put onto an adhesive tape manufactured by 3M Corporation and then measured for 180° peel strength at 23° C. and 70% RH.

The result was 50 g. It was found that the practical adhesive strength is preferably in the range of 10 g or more, particularly 20 g or more.

(13) Abrasion

The surface of the magnetic layer was measured for ball abrasion at 23° C. and 70% RH.

The specimen was fixed onto a preparation glass at both ends with an adhesive tape. A 6.25-mm φ steel ball was allowed to slide on the specimen with a load of 50 g applied thereto. Specifically, the steel ball travelled once through a distance of 20 mm at a speed of 20 mm/sec. The ball steel was then moved to another test surface. The same experiment was repeated 20 times. The surface thus-tested was then observed under microscope at ×40 magnification. Assuming that the surface is circle, its diameter was determined. From the diameter, abrasion was calculated.

The result was $0.7 \times 10^{-5}$ to $1.1 \times 10^{-5}$ m$^3$. It was found that the practical abrasion is preferably in the range of $0.1 \times 10^{-5}$ to $5 \times 10^{-5}$ m$^3$, particularly $0.4 \times 10^{-5}$ to $2 \times 10^{-5}$ m$^3$.

(14) SEM (scanning electron microscope)

The magnetic layer was observed for surface conditions under scanning electron microscope.

The magnetic layer was photographed under an electron microscope S-900 manufactured by Hitachi Ltd. at a ×5,000 magnification. Five copies of the photograph were obtained. On these copies, abrasives on the surface of the magnetic layer were measured.

As a result, the number of abrasive grains was 0.2/μm$^2$. It was found that the practical number of abrasive grains is preferably in the range of 0.1/μm$^2$ or more, particularly 0.12/μm$^2$ to 0.5/μm$^2$.

(15) GC (gas chromatography)

The amount of residual solvents in the magnetic tape was determined by gas chromatography.

Using a gas chromatography GC-14A manufactured by Shimadzu Seisakusho Ltd., a 20-cm$^2$ specimen was heated to a temperature of 120° C. for the measurement of the amount of residual solvents in the magnetic recording medium.

The amount of residual solvents was 8 mg/m$^2$. It was found that the practical amount of residual solvents is preferably in the range of 50 mg/m$^2$ or less, particularly 20 mg/m$^2$ or less.

(16) Sol fraction

The ratio of soluble content extracted from the magnetic layer in the magnetic tape with THF to the weight of the magnetic layer was determined. As a result, the sol fraction was 7%. It was found that the practical sol fraction is preferably in the range of 15% or less, particularly 10% or less.

The 8-mm video tape according to the present invention having the above mentioned properties were compared with commercially available video tapes. The results are set forth in Table 3.

TABLE 3

|  | Present invention | | Commercial tape | |
| --- | --- | --- | --- | --- |
|  | Specimen 1 PET support | Specimen 2 PEN support | (1) single layer MP tape | (2) ME tape |
| Electro-magnetic characteristics |  |  |  |  |
| 7 MHz output (dB) | 5.5 | 6.0 | 3.0 | 6.2 |
| C/N (dB) | 4.3 | 4.5 | 2.0 | 4.1 |
| Color S/N (dB) | 2.5 | 2.6 | 2.5 | −3.0 |
| Video S/N (dB) | 2.1 | 2.3 | 1.5 | 0.5 |
| Durability |  |  |  |  |
| Dropout | 40 | 30 | 30 | 580 |
| BER (× 10$^{-5}$) | 4 | 2 | 50 | 80 |
| Jitter | E | E | E | P |
| Still | 30 min. or more | 30 min. or more | 30 min. or more | 30 min. or more |
| Head abrasion (3) | 1.2 | 1.4 | 2.0 | 0.2 |
| Storage stability (4) | E | E | E | P |
| Running durability | E | E | E | P |
| Scratch | E | E | E | FP |

(1) Make: Fuji Photo Film Co., Ltd. (Lot No. 407209M)
(2) Make: Sony Corp. (Lot No. 709011CD)
(3) Unit: μm/100 hr.
(4) Condition: 60° C., 90% RH These properties were evaluated in accordance with the above mentioned methods or general methods.

The criteria were as follows:

Jitter:

E . . . less than 0.2 μ sec.

P . . . 0.2 μ sec. or more

Storage stability:

E . . . No rust on the surface after storage at 60° C., 90% for 2 weeks

P . . . Rust on the surface after storage at 60° C., 90% for 2 weeks

Running durability: 120-minute reproduction was repeated in a 8-mm cassette 100 times E . . . No clogging that lasts 5 min. or more P . . . Clogging after 100 repeats Scratch: 10 minute running was conducted in still mode E . . . No scratches visually observed P . . . Scratches visually observed

EXAMPLE 4

(Basic formulation)

| Lower nonmagnetic layer | |
| --- | --- |
| Inorganic powder TiO$_2$ | 80 parts |
| Average grain diameter: 0.035 μm | |
| Crystalline system: rutile | |
| TiO$_2$ content: 90% by weight | |
| Surface layer on inorganic | |
| powder: Al$_2$O$_3$ (10% by weight) | |
| Specific surface area by BET method: 40 m$^2$/g | |
| DBP oil adsorption: 27–38 g/100 g | |
| pH: 7 | |
| Carbon black | 20 parts |
| Average grain diameter: 16 mμ | |
| DBP oil adsorption: 80 ml/100 g | |
| pH: 8.0 | |
| Specific surface area by BET method: 250 m$^2$/g | |
| Volatile content: 1.5% | |
| Vinyl chloride copolymer | 12 parts |
| (MR-110; containing —SO$_3$Na group | |
| in an amount of 5 × 10$^{-6}$ eq/g and | |
| an epoxy group in an amount of 3.5% | |
| by weight in terms of monomer unit; | |
| polymerization degree: 350) | |
| Polyester polyurethane resin | 5 parts |
| (neopentyl glycol/caprolactone | |
| polyol/MDI = 0.9/2.6/1; containing | |
| —SO$_3$Na group in an mount of 1 × 10$^{-4}$ eq/g) | |
| Butyl stearate | 1 part |
| Stearic acid | 1 part |
| Methyl ethyl ketone | 200 parts |
| Upper magnetic layer (common to the following examples) | |
| Ferromagnetic alloy powder | 100 parts |
| (% composition: Fe:Ni:Co = 93:3:3) | |
| Hc: 1,600 Oe | |
| Specific surface area: 58 m$^2$/g | |
| Crystallite size: 170 Å | |
| Grain size (length in the long axis): 0.18 μm | |
| Acicular ratio: 8 | |
| Saturated magnetization σs: 125 emu/g | |
| Vinyl chloride copolymer | 12 parts |
| (MR-110; containing —SO$_3$Na group | |
| in an amount of 5 × 10$^{-6}$ eq/g and | |
| an epoxy group in an amount of 3.5% | |
| by weight in terms of monomer unit; | |
| polymerization degree: 350) | |
| Polyester polyurethane resin | 3 parts |
| (neopentyl glycol/caprolactone | |
| polyol/MDI = 0.9/2.6/1; containing | |
| —SO$_3$Na group in an amount of | |
| 1 × 10$^{-4}$ eq/g) | |
| α-Alumina | 5 parts |
| (average grain diameter: 0.3 μm) | |
| Carbon black | 0.5 parts |
| (average grain diameter: 0.10 μm) | |
| Butyl stearate | 1 part |
| Stearic acid | 2 parts |
| Methyl ethyl ketone | 200 parts |

For the two coating solutions, the respective components were kneaded by means of a continuous kneader and then dispersed by means of a sand mill. To the dispersions thus-obtained were added a polyisocyanate in an amount of 1 part for the coating solution for the lower nonmagnetic layer and 3 parts for the coating solution for the upper magnetic layer and butyl acetate in an amount of 40 parts for each coating solution. The materials were each filtered through a filter having an average pore diameter of 1 μm to prepare the coating solutions for the lower nonmagnetic layer and the upper magnetic layer.

The coating solution for the lower nonmagnetic layer and the coating solution for the upper magnetic layer were subjected to simultaneous multi-layer coating. Specifically, the coating solution for the lower nonmagnetic layer was coated on a 7-μm thick polyethylene terephthalate support having a center-line average surface roughness of 0.01 μm to a dry thickness of 2 μm. The coating solution for the upper magnetic layer was immediately coated thereon to a dry thickness of 0.2 μm. While the two layers were wet, the material was oriented under a cobalt magnet having a magnetic force of 3,000 G and a solenoid having a magnetic force of 1,500 G. After being dried, the material was treated through a 7-stage calender made of only metal rolls at a temperature of 90° C. The material was then slit into 8-mm wide strips to prepare a 8-mm video tape.

EXAMPLE 4-1

To the basic formulation were added 2.4 parts of phenylphosphonic acid as a surface treatment for inorganic powder according to the present invention simultaneously with the inorganic powder and the binder. This amount corresponds to 3 μmol/m² based on the specific surface area of powder used.

EXAMPLE 4-2

To the basic formulation were added 4.8 parts of an epoxy-containing compound represented by the following formula as a surface treatment for inorganic powder according to the present invention. This amount corresponds to 3 μmol/m² based on the specific surface area of powder used.

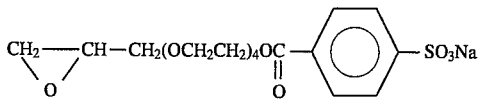

EXAMPLE 4-3

To the basic formulation were added 30 parts of γ-glycidoxypropyltrimethoxysilane (silane coupling agent) as a surface treating agent for inorganic powder according to the present invention. This amount corresponds to 3 μmol/m² based on the specific surface area of powder used.

EXAMPLE 4-4

The inorganic powder contained in the basic formulation was altered to the following $\alpha Fe_2O_3$:

| | |
|---|---|
| $\alpha Fe_2O_3$ | 80 parts |
| Surface layer: $Al_2O_3$ (10 wt %) | |
| Average grain diameter: 0.03 μm | |
| Specific surface area by BET method: 35 m²/g | |

Further, 2.1 parts of phenylphosphonic acid were added to the system according to the present invention. This amount corresponds to 3 μmol/m² based on the specific surface area of powder used.

EXAMPLE 4-5

The inorganic powder contained in the basic formulation was altered to the following $BaSO_4$:

| | |
|---|---|
| $BaSO_4$ | 80 parts |
| Surface layer: $Al_2O_3$ (10 wt %) | |
| Average grain diameter: 0.04 μm | |
| Specific surface area by BET method: 50 m²/g | |

Further, 3.0 parts of phenylphosphonic acid were added to the system according to the present invention. This amount corresponds to 3 μmol/m² based on the specific surface area of powder used.

EXAMPLE 4-6

The inorganic powder contained in the basic formulation was altered to the following $TiO_2$:

| | |
|---|---|
| $TiO_2$ | 80 parts |
| Surface layer: $Al_2O_3$ (10 wt %) | |
| Average grain diameter: 0.08 μm | |
| Specific surface area by BET method: 16 m²/g | |

Further, 5.5 parts of phenylphosphonic acid were added to the system according to the present invention. This amount corresponds to 3 μmol/m² based on the specific surface area of powder used.

EXAMPLE 4-7

To the basic formulation were added 2.4 parts of phenylphosphonic acid as a surface treating agent for the inorganic powder according to the present invention. This amount corresponds to 3 μmol/m² based on the specific surface area of powder used. The thickness of the upper magnetic layer was 0.8 μm.

EXAMPLE 4-8

To the basic formulation were added 0.4 parts of phenylphosphonic acid as a surface treating agent for the inorganic powder according to the present invention. This amount corresponds to 3 μmol/m² based on the specific surface area of powder used.

EXAMPLE 4-9

To the basic formulation were added 20 parts of phenylphosphonic acid as a surface treating agent for the inorganic powder according to the present invention. This amount corresponds to 3 μmol/m² based on the specific surface area of powder used.

COMPARATIVE EXAMPLE 4-1

Instead of using $TiO_2$ in the lower layer, the following formulation was used:

| | |
|---|---|
| Carbon black | 50 parts |
| Average primary grain diameter: 16 mμ | |
| DBP oil adsorption: 80 ml/100 g | |
| pH: 8.0 | |
| Specific surface area by BET method: 250 m²/g | |
| Volatile content: 1.5% | |
| Vinyl chloride copolymer | 18 parts |
| (MR-110; containing —$SO_3Na$ group | |
| in an amount of $5 \times 10^{-6}$ eq/g and | |
| an epoxy group in an amount of 6.5% | |
| by weight in terms of monomer unit; | |
| polymerization degree: 350) | |
| Polyester polyurethane resin | 7 parts |
| (neopentyl glycol/caprolactone | |
| polyol/MDI = 0.9/2.6/1; containing | |
| —$SO_3Na$ group in an amount of | |
| $1 \times 10^{-4}$ eq/g | |
| Butyl stearate | 1 part |
| Stearic acid | 1 part |
| Methyl ethyl ketone | 200 parts |

COMPARATIVE EXAMPLE 4-2

The same formulation as used in Example 4-1 was used, but the coating method was a successive coating method.

COMPARATIVE EXAMPLE 4-3

The inorganic powder to be contained in the basic formulation was altered to the following $TiO_2$:

| | |
|---|---|
| $TiO_2$ | 80 parts |
| Surface layer: $Al_2O_3$ (10 wt %) | |
| Average grain diameter: 0.2 µm | |
| Specific surface area by BET method: 9 m$^2$/g | |

COMPARATIVE EXAMPLE 4-4

The basic formulation was used.

COMPARATIVE EXAMPLE 4-5

The basic formulation was used, but $TiO_2$ had been previously surface-treated with trimethylol propane of polyol.

COMPARATIVE EXAMPLE 4-6

To the basic formulation were added 2.4 parts of lauric acid as a dispersant for inorganic powder to be contained in the lower layer. This amount corresponds to 3 µmol/m$^2$ based on the specific surface area of powder used.

COMPARATIVE EXAMPLE 4-7

To the basic formulation were added 0.1 parts of phenylphosphonic acid as a dispersant for inorganic powder to be contained in the lower layer. This amount corresponds to 0.125 µmol/m$^2$ based on the specific surface area of powder used.

COMPARATIVE EXAMPLE 4-8

To the basic formulation were added 32 parts of phenylphosphonic acid as a dispersant for inorganic powder to be contained in the lower layer. This amount corresponds to 40 µmol/m$^2$ based on the specific surface area of powder used.

COMPARATIVE EXAMPLE 4-9

To the basic formulation were added 2.4 parts of phenylphosphonic acid as a dispersant for inorganic powder to be contained in the lower layer. This amount corresponds to 3 µmol/m$^2$ based on the specific surface area of powder used. The thickness of the magnetic layer was 1.5 µm.

COMPARATIVE EXAMPLE 4-10

The same formulation as used in Example 1 was used, except that the charged amount of the aliphatic acid in the lower layer was 2.5 parts.

The specimens thus-obtained were then evaluated for the following properties. The results are set forth in Tables 4-1 and 4-2.

(Evaluation method)

Center-line average surface roughness:

The center-line average surface roughness was determined by means of a three-dimensional surface roughness meter (produced by Kosaka Kenkyujo) at cutoff value of 0.25 mm.

C/N:

Using a 8-mm video deck (FUJIX8 manufactured by Fuji Photo Film Co., Ltd.), a 7 MHz signal is recorded on the specimen. When the recorded 7 MHz signal was reproduced from the specimen, noise generated at I6 MHz is measured by a spectrum analyzer (produced by Hitachi Ltd.). The ratio of the noise to the reproduced signal is determined.

Jitter:

The jitter value of the specimens was measured by a jitter meter.

µ value:

The specimen was retained horizontal via a guiding member in a load cell in contact with a stainless pole (SUS420J: pole surface roughness Ra: 0.06 to 0.08 µm as determined by contact roughness meter at cutoff value of 0.25 µ) at a tension ($T_1$) of 20 g (winding angle: 180°) at 23° C. and 70% RH. Under these conditions, the tension ($T_2$) required to allow the specimen to travel horizontally at a rate of 14 mm/sec was measured. On the basis of these measurements, the frictional coefficient (µ value) was calculated according to the following equation:

$$\mu = (1/\pi) \cdot \ln(T_2/T_1)$$

TABLE 4-1

| Specimen No. | Inorganic powder in lower layer | | Thickness of upper layer (µm) | Surface treating agent | | Coating method |
|---|---|---|---|---|---|---|
| | Kind | Grain diameter (µm) | | Kind | Added amount (µmol/m$^2$) | |
| Example 4-1 | $TiO_2$ rutile | 0.03 | 0.2 | Phenylphosphonic acid | 3 | Simultaneous coating |
| Example 4-2 | $TiO_2$ rutile | 0.03 | 0.2 | Epoxy shown in Example 4-2 | 3 | Simultaneous coating |
| Example 4-3 | $TiO_2$ rutile | 0.03 | 0.2 | SC agent*[1] | 3 | Simultaneous coating |
| Example 4-4 | $\alpha Fe_2O_3$ | 0.02 | 0.2 | Phenylphosphonic acid | 3 | Simultaneous coating |
| Example 4-5 | $Ba_2SO_4$ | 0.04 | 0.2 | Phenylphosphonic acid | 3 | Simultaneous coating |
| Example 4-6 | $TiO_2$ rutile | 0.08 | 0.2 | Phenylphosphonic acid | 3 | Simultaneous coating |
| Example 4-7 | $TiO_2$ rutile | 0.03 | 0.8 | Phenylphosphonic acid | 3 | Simultaneous coating |
| Example | $TiO_2$ rutile | 0.03 | 0.2 | Phenylphos- | 25 | Simultaneous |

TABLE 4-1-continued

| | | | | | | |
|---|---|---|---|---|---|---|
| 4-8 Example 4-9 | TiO₂ rutile | 0.03 | 0.2 | phonic acid Phenylphosphonic acid | 0.5 | coating Simultaneous coating |

| Specimen No. | Amount of aliphatic acid Charged amount*² | Amount of free aliphatic acid (%) | μ Value | Ra (nm) | C/N (dB) | Jitter (μsec) |
|---|---|---|---|---|---|---|
| Example 4-1 | 0.90 | 73 | 0.26 | 2.0 | 2.5 | 0.08 |
| Example 4-2 | 0.88 | 65 | 0.28 | 2.9 | 1.8 | 0.14 |
| Example 4-3 | 0.75 | 76 | 0.25 | 3.1 | 1.9 | 0.10 |
| Example 4-4 | 0.90 | 59 | 0.29 | 2.5 | 2.3 | 0.10 |
| Example 4-5 | 0.90 | 80 | 0.21 | 2.9 | 2.2 | 0.14 |
| Example 4-6 | 0.88 | 53 | 0.27 | 3.0 | 1.7 | 0.07 |
| Example 4-7 | 1.1 | 58 | 0.27 | 1.8 | 2.2 | 0.08 |
| Example 4-8 | 0.91 | 85 | 0.19 | 1.9 | 1.8 | 0.09 |
| Example 4-9 | 0.79 | 52 | 0.29 | 2.6 | 1.8 | 0.12 |

*¹γ-Glycidoxypropyltrimethoxysilane
*²parts by weight based on 100 parts by weight of inorganic powder (except carbon) in lower layer

TABLE 4-2

| Specimen No. | Inorganic powder in lower layer Kind | Grain diameter (μm) | Thickness of upper layer (μm) | Surface treating agent Kind | Added amount (μmol/m²) | Coating method |
|---|---|---|---|---|---|---|
| Comp. Ex. 4-1 | Carbon black | 0.02 | 0.2 | None | — | Simultaneous coating |
| Comp. Ex. 4-2 | TiO₂ rutile | 0.03 | 0.2 | Phenylphosphonic acid | 3 | Successive coating |
| Comp. Ex. 4-3 | TiO₂ | 0.2 | 0.2 | Phenylphosphonic acid | 3 | Simultaneous coating |
| Comp. Ex. 4-4 | TiO₂ rutile | 0.03 | 0.2 | — | — | Simultaneous coating |
| Comp. Ex. 4-5 | TiO₂ rutile | 0.03 | 0.2 | Trimethylol propane | 3 | Simultaneous coating |
| Comp. Ex. 4-6 | TiO₂ rutile | 0.03 | 0.2 | Lauric acid | 3 | Simultaneous coating |
| Comp. Ex. 4-7 | TiO₂ rutile | 0.03 | 0.2 | Phenylphosphonic acid | 0.125 | Simultaneous coating |
| Comp. Ex. 4-8 | TiO₂ rutile | 0.03 | 0.2 | Phenylphosphonic acid | 40 | Simultaneous coating |
| Comp. Ex. 4-9 | TiO₂ rutile | 0.03 | 2.0 | Phenylphosphonic acid | 3 | Simultaneous coating |
| Comp. Ex. 4-10 | TiO₂ rutile | 0.03 | 0.2 | Phenylphosphonic acid | 3 | Simultaneous coating |

| Specimen No. | Amount of aliphatic acid Charged amount*² | Amount of free aliphatic acid (%) | μ Value | Ra (nm) | C/N (dB) | Jitter (μsec) |
|---|---|---|---|---|---|---|
| Comp. Ex. 4-1 | 1.3 | 97 | 0.17 | 5.5 | −2.4 | 0.06 |
| Comp. Ex. 4-2 | 1.3 | 70 | 0.28 | 4.7 | −1.5 | 0.10 |
| Comp. Ex. 4-3 | 0.91 | 70 | 0.24 | 4.2 | 0.5 | 0.12 |

TABLE 4-2-continued

| | | | | | | |
|---|---|---|---|---|---|---|
| Comp. Ex. 4-4 | 0.91 | 38 | 0.37 | 3.7 | 0 | 0.4 |
| Comp. Ex. 4-5 | 0.91 | 43 | 0.41 | 3.8 | 0.3 | 0.5 |
| Comp. Ex. 4-6 | 0.9* | 68* | 0.42 | 3.6 | 0.6 | 0.4 |
| Comp. Ex. 4-7 | 0.91 | 48 | 0.39 | 3.7 | 0.4 | 0.24 |
| Comp. Ex. 4-8 | 0.74 | 85 | 0.35 | 4.2 | −0.5 | 0.10 |
| Comp. Ex. 4-9 | 1.2 | 70 | 0.25 | 1.8 | −0.6 | 0.08 |
| Comp. Ex. 4-10 | 2.5 | 71 | 0.38 | 3.6 | −1.2 | 0.2 |

*Lauric acid excluded
*²Parts by weight based on 100 parts by weight of inorganic powder (except carbon) in lower layer These tables show the following conclusions:

EXAMPLES 4-1 TO 4-5

The enhancement of the dispersibility by the surface treating agent for inorganic powder in the lower layer provides improved surface smoothness as well as improved electro-magnetic characteristics such as C/N. The strong adsorption of an organic compound as a surface treating agent by the inorganic powder in the lower layer prevents an aliphatic acid as a lubricant (i.e., stearic acid) from being adsorbed by the inorganic powder, making an effective use of the aliphatic acid and thus reducing jitter and improving running properties.

EXAMPLE 4-6

As compared with Example 4-1, the average grain diameter of the inorganic powder was great. However, even if the average grain diameter was about 0.08 μm, there was no big rise in the surface roughness and no big drop in the electro-magnetic characteristics.

EXAMPLE 4-7

As compared with Example 4-1, the thickness of the magnetic layer was great. However, even if the thickness was about 0.8 μm, there was little or no drop in the electro-magnetic characteristics.

EXAMPLE 4-8

The amount of the surface treatment was greater than that used in Example 4-1. The electro-magnetic characteristics show some drop due to packing. However, sufficient effects could be exerted.

EXAMPLE 4-9

Since the amount of the surface treatment was less than used in Example 4-1, there was decrease in the surface roughness due to the drop in the dispersibility. However, sufficient effects could be exerted.

COMPARATIVE EXAMPLE 4-1

Since the subbing layer was free of inorganic powder, the magnetic recording medium had a poor flexibility, causing a poor head contact. Further, the lower layer thus-coated had deteriorated surface properties, deteriorating the surface properties of the magnetic layer. This resulted in the deterioration of the electro-magnetic characteristics.

COMPARATIVE EXAMPLE 4-2

The successive coating method caused deteriorated surface properties. This resulted in the deterioration of the electro-magnetic characteristics.

COMPARATIVE EXAMPLE 4-3

Since the inorganic powder in the lower layer had a great grain size, the dispersibility was excellent. However, poor surface properties were obtained.

COMPARATIVE EXAMPLE 4-4

Since the inorganic powder in the lower layer was a finely divided powder, it easily agglomerated, giving poor surface properties and hence deteriorated electro-magnetic characteristics. Further, since the lubricant could be easily adsorbed by the powder, the lubricating effect was insufficient. Further, jitter is deteriorated.

COMPARATIVE EXAMPLES 4-5 to 4-6

Polyol or lauric acid as surface treating agent was cross-adsorbed by stearic acid incorporated as a lubricant, causing a drop in the dispersibility and running properties.

COMPARATIVE EXAMPLE 4-7

Since the amount of phenylphosphonic acid as a surface treating agent was small, sufficient dispersing effect could not be obtained, giving little or no improvements in the surface properties and running properties.

COMPARATIVE EXAMPLE 4-8

Since the amount of phenylphosphonic acid as a surface treating agent was too great, there occurred some disorder in the surface of the lower layer.

COMPARATIVE EXAMPLE 4-9

Since the thickness of the magnetic layer was great, the electro-magnetic characteristics were deteriorated due to thickness loss.

COMPARATIVE EXAMPLE 4-10

Since the charged amount of aliphatic acid was great, the film was plasticized, causing a rise in the frictional coefficient and hence worsening jitter.

EXAMPLE 5

As a nonmagnetic support there was used a polyethylene terephthalate (thickness: 10 μm; F5 value: 20 kg/mm² in MD direction, 14 kg/mm² in TD direction; Young's modulus: 750 kg/mm² in MD direction, 470 kg/mm² in TD direction) or polyethylene terenaphthalate (thickness: 7 μm; F5 value: 22 kg/mm² in MD direction, 18 kg/mm² in TD direction; Young's modulus: 750 kg/mm² in MD direction, 750 kg/mm² in TD direction). The following compositions were then stirred by a disper agitator for 12 hours to prepare an undercoating solution:

| | |
|---|---|
| Polyester resin (containing —SO₃Na group; Tg: 65° C.; Na content: 4,600 ppm) | 100 parts |
| Cyclohexanone | 9,900 parts |

The undercoating solution thus-obtained was coated on the nonmagnetic support by means of a bar coater to a dry thickness of 0.1 μm.

On the other hand, an upper magnetic layer coating solution and a lower nonmagnetic layer coating solution were prepared according to the following formulations:

| Coating solution for upper magnetic layer | |
|---|---|
| Ferromagnetic powder: Fe alloy powder (Fe—Co—Ni) Composition: Fe:Co:No:Ni = 92:6:2 Sintering inhibitor: Al₂O₃ Hc: 1,600 Oe σs: 119 emu/g Length in the long axis: 0.13 μm Acicular ratio: 7 Crystallite size: 172 Å Water content: 0.6% by weight | 100 parts |
| Vinyl chloride copolymer (containing —SO₃Na in an amount of 8 × 10⁻⁵ eq/g; containing —OH and epoxy group; Tg: 71° C.; polymerization degree: 300; number-average molecular weight (Mn): 12,000; weight-average molecular weight (Mw): 38,000) | 13 parts |
| Polyurethane resin (containing —SO₃Na in an amount of 8 × 10⁻⁵ eq/g and —OH group in an amount of 8 × 10⁻⁵ eq/g; Tg: 38° C.; Mw: 50,000) | 5 parts |
| α-Alumina (average grain diameter: 0.15 μm; S$_{BET}$: 8.7 m²/g; pH: 8.2; water content: 0.06% by weight) | 12 parts |
| Cyclohexanone | 150 parts |
| Methyl ethyl ketone | 150 parts |

These components were dispersed in an admixture by a sand mill for 6 hours. To the dispersion thus obtained were added 5 parts of polyisocyanate (Coronate L) and oleic acid, 7 parts of stearic acid and 15 parts of butyl stearate to prepare a coating solution for the upper magnetic layer.

| Coating solution for lower nonmagnetic layer | |
|---|---|
| TiO₂ Average grain diameter: 0.035 μm Crystalline system: Rutile TiO₂ content: 90% or more Surface layer: Al₂O₃ (10 wt %) S$_{BET}$: 35–45 m²/g True specific gravity: 4.1 pH: 6.5–8.0 | 85 parts |
| Carbon black Average grain diameter: 16 mμ | 5 parts |
| DBP oil adsorption: 80 ml/100 g pH: 8.0 S$_{BET}$: 250 m²/g Coloring power: 143% | |
| Vinyl chloride copolymer (containing —SO₃Na in an amount of 8 × 10⁻⁵ eq/g; containing —OH and epoxy group; Tg: 71° C.; polymerization degree: 300; number-average molecular weight (Mn): 12,000; weight-average molecular weight (Mw): 38,000) | 13 parts |
| Polyurethane resin (containing —SO₃Na in an amount of 8 × 10⁻⁵ eq/g and —OH group in an amount of 8 × 10⁻⁵ eq/g; Tg: 38° C.; Mw: 50,000) | 5 parts |
| Organic compound (phenylsulfonic acid) | 2.4 parts |
| Cyclohexane | 100 parts |
| Methyl ethyl ketone | 100 parts |

These components were dispersed in an admixture by a sand mill for 4 hours. To the dispersion thus-obtained were added 5 parts of polyisocyanate (Coronate L), 5 parts of oleic acid, 5 parts of stearic acid and 15 parts of butyl stearate to prepare a coating solution for the lower nonmagnetic layer.

The two coating solutions were wet-on-wet coated by means of two doctors having different gaps. The coat material was oriented under a permanent magnet of 3,500 G and a solenoid of 1,600 G, and then dried. The material was then subjected to supercalendering between a pair of metallic rolls at a temperature of 80° C. In the coating material, the thickness of the magnetic layer and the nonmagnetic layer were 0.3 μm and 3.0 μm, respectively.

A coating solution was prepared according to the following formulation:

| BC layer | |
|---|---|
| Carbon black S$_{BET}$: 220 m²/g Average grain diameter: 17 mμ DBP oil adsorption: 75 ml/100 g Volatile content: 1.5% pH: 8.0 Bulk density: 15 lbs/ft³ | 100 parts |
| Nitrocellulose (RS1/1) | 100 parts |
| Polyester polyurethane (Nippllan manufactured by Nippon Polyurethane Co., Ltd.) | 30 parts |
| Dispersant | |
| Copper oleate | 10 parts |
| Copper phthalocyanine | 10 parts |
| Barium sulfate (precipitable) | 5 parts |
| Methyl ethyl ketone | 500 parts |
| Toluene | 500 parts |

These compositions were previously kneaded, and then kneaded by a roll mill. To 100 parts by weight of the dispersion were added the following compositions:

| | |
|---|---|
| Carbon black S$_{BET}$: 200 m²/g Average grain diameter: 200 mμ DBP oil adsorption: 36 ml/100 g pH: 8.5 | 100 parts |
| α-Al₂O₃ (average grain diameter: 0.2 μm) | 0.1 part |

The mixture was subjected to dispersion by a sand grinder. After filtration, to 100 parts by weight of the dispersion, were added the following compositions:

| | |
|---|---|
| Methyl ethyl ketone | 120 parts |
| Polyisocyanate | 5 parts |

The coating solution thus-obtained was coated on the opposite side of the nonmagnetic support by a bar coater to a dry thickness of 0.5 μm. The coat material was slit into 8-mm wide strips. Thus, Specimen 1 (PET support) and Specimen 2 (PEN support) were prepared in the form of 8-mm video tape.

The 8-mm video tapes thus-obtained were then measured for the following properties:

(1) TEM (transmission electron microscope)

An ultrathin section of the magnetic layer was observed under a transmission electron microscope.

The magnetic recording medium was cut into a specimen having a thickness of about 0.1 μm by a diamond cutter. The specimen was observed and photographed under the transmission electron microscope. On the photograph, the interface between the upper layer and the lower layer and the surface of the magnetic layer were edged, and the thickness of the magnetic layer was then measured by an image processor IBAII. From these measurements, the average value d and the standard deviation σ were determined.

The average value d of the thickness of the magnetic layer was 0.45 μm. It was found that the practical average value d is preferably in the range of 1 μm or less, particularly 0.6 μm or less. The standard deviation σ of the fluctuations of the thickness of the magnetic layer was 0.008 μm or less. It was found that the practical standard deviation σ is preferably in the range of 0.02 μm or less, particularly 0.01 μm or less.

The magnetic tape was stretched to make the magnetic layer free from the support. The magnetic layer was then peeled off the support with a cutter blade. 500 mg of the magnetic layer thus peeled was refluxed in 100 ml of a 1N methanol solution of NaOH to hydrolyze the binder. Since the ferromagnetic powder has a great specific gravity, it sank to the bottom. The supernatant solution was then removed.

The ferromagnetic powder was washed with water three times by decantation and-then washed with THF three times. The ferromagnetic powder thus-obtained was then dried at a temperature of 50° C. in a vacuum dryer. The ferromagnetic powder was then dispersed in collodion. The dispersed ferromagnetic powder was then observed under the transmission electron microscope. As a result, the ferromagnetic grains were found to have a length in the long axis of 0.13 μm and an acicular ratio of 10. It was found that the practical length in the long axis needs to be 0.4 μm or less, preferably 0.3 μm or less, and the practical acicular ratio needs to be in the range of 2 to 20, preferably 2 to 15.

(2) AFM (Atomic Force Micro Scope)

The surface roughness $R_{rms}$ was measured. The surface of the magnetic layer was scanned by Nanoscopell manufactured by Digital Instrument Inc. within a zone of 6 μm×6 μm at a tunnel current of 10 nA and a bias voltage of 400 mV. For the surface roughness, $R_{rms}$ in this zone was determined.

As a result, $R_{rms}$ was 6 nm. It was found that the practical $R_{rms}$ needs to be 10 nm or less, preferably 8 nm or less.

(3) Surface roughness meter

The surface roughness was measured by 3d-MIRAU. Using TOPO3D manufactured by WYKO Co., Ltd., Ra, $R_{rms}$ and peak-valley value in a zone of about 250 mm×250 mm were measured by MIRAU method. Spherical surface correction and cyclinder correction were conducted at a measurement wavelength of about 650 nm. This is a non-contact surface roughness meter which operates with light interference. Ra was 2.7 nm. It was found that the practical Ra is preferably in the range of 1 to 4 nm, more preferably 2 to 3.5 nm. $R_{rms}$ was 3.5 nm. It was found that the practical $R_{rms}$ is preferably in the range of 1.3 to 6 nm, more preferably 1.5 to 5 nm. P-V value was 20 to 30 nm. It was found that the practical P-V value is preferably in the range of 80 nm or less, more preferably 10 to 60 nm.

(4) VSM (vibrating specimen type magnetometer)

The magnetic tape was measured for the magnetic characteristics of the magnetic layer by a vibrating specimen type magnetometer manufactured by Toei Kogyo K.K. at Hm of 5 kOe.

As a result, Hc was 1,620 Oe, Hr (90°) was 1,800 Oe, Br/Bm was 0.82, and SFD was 0.583. It was found that the practical Hc needs to be in the range of 1,500 to 2,500 Oe, preferably 1,600 to 2,000 Oe. It was also found that the practical Hr (90°) needs to be in the range of 1,000 to 2,800 Oe, preferably 1,200 to 2,500 Oe. It was further found that the practical Br/Bm needs to be in the range of 0.75 or more, preferably 0.8 or more. It was further found that the practical SFD needs to be in the range of 0.7 or less, preferably 0.6 or less.

(5) X-ray diffraction

The ferromagnetic powder extracted from the magnetic layer in the test (1) was subjected to X-ray diffraction.

The magnetic tape was directly subjected to X-ray diffraction. From the spread of the half value width of diffraction line between (4,4,0) plane and (2,2,0) plane, the crystallite size was determined to be 180 Å. It was found that the practical crystallite size is preferably in the range of 400 Å or less, particularly 100 to 300 Å.

(6) Tensile test

The magnetic tape was measured for Young's modulus, yield stress and yield elongation in tension by a tensile testing machine (universal tensile testing machine STM-T-50B manufactured by Toyo Baldwin Co., Ltd.) at a pulling rate of 10%/min. in an atmosphere of 23° C. and 70% RH.

The magnetic tape showed a Young's modulus of 1,200 kg/mm$^2$ at an elongation of 0.5%, a yield stress of 6 to 7 kg/mm$^2$, and a yield elongation in tension of 0.8%. It was found that the practical Young's modulus at an elongation of 0.5% is preferably in the range of 400 to 2,000 kg/mm$^2$, more preferably 500 to 1,500 kg/mm$^2$. It was also found that the practical yield stress is preferably in the range of 3 to 20 kg/mm$^2$, particularly 4 to 14 kg/mm$^2$. It was further found that the practical yield elongation in tension is preferably in the range of 0.2 to 8%, particularly 0.4 to 5%.

(7) Bending rigidity, loop stiffness

A loop specimen was prepared from a 8-mm wide and 50-mm long specimen. The loop specimen was then measured by a loop stiffness tester for the force (mg) required to give a deformation of 5 mm at a deformation rate of about 3.5 mm/sec.

As a result, the 8-mm p6-120 tape had a thickness of 10.5 μm and showed a stiffness of 40 to 60 mm. It was found that the practical stiffness is preferably in the range of 20 to 90 mg, particularly 30 to 70 mg, if the thickness of the tape is within 10.5±1 μm. It was also found that the practical stiffness is preferably in the range of 40 to 200 mg if the thickness of the tape is 11.5 μm or more. It was further found that the practical stiffness is preferably in the range of 10 to 70 mg if the thickness of the tape is 9.5 μm or less.

(8) Tensile breakage

The frequency of cracking was measured at 23° C. and 70% RH.

A 10-cm long tape specimen was observed under a microscope at ×400 magnification for the frequency of 5 or more evident cracks occurring on the surface of the magnetic layer while it was pulled from both ends at a pulling rate of 0.1 mm/sec.

The frequency of cracking was 4%. It was found that the practical frequency of cracking is preferably in the range of 20% or less, particularly 10% or less.

(9) Heat shrinkage

After being stored at a temperature of 70° C. for 48 hours, the magnetic tape was measured for heat shrinkage.

The specimen was stored in a 70° C. constant temperature bath for 48 hours. The change in the length from before to after storage was divided by the initial length to determine the heat shrinkage.

The heat shrinkage was 0.2%. It was found that the practical heat shrinkage is preferably in the range of 0.4% or less, particularly 0.1 to to 0.3%.

(10) ESCA

Cl/Fe spectrum $\alpha$ and N/Fe spectrum $\beta$ were measured.

For the measurement of $\alpha$ and $\beta$, an X-ray photoelectron spectrometer (produced by PERKIN-FLMER Co., Ltd.). As X-ray source there was used an Mg anode. The measurement was conducted at 300 W. The lubricant contained in the video tape was washed away with n-hexane. The video tape was then mounted in the X-ray photoelectron spectrometer. The distance between the X-ray source and the specimen was 1 cm. The specimen system was evacuated to vacuum. After 5 minutes, Cl-2P spectrum, N-1S spectrum, and Fe-2P(3/2) spectrum were integrated and measured for 10 minutes. The bath energy was maintained at 100 eV. The integrated intensity ratio of Cl-2P spectrum to Fe-2P(3/2) spectrum was calculated to determine $\alpha$.

Further, the integrated intensity ratio of N-1S spectrum to Fe-2P(3/2) spectrum was calculated to determine $\beta$.

As a result, $\alpha$ was 0.45, and $\beta$ was 0.07. It was found that the practical $\alpha$ is preferably in the range of 0.3 to 0.6, particularly 0.4 to 0.5. It was also found that the practical $\beta$ is preferably in the range of 0.03 to 0.12, particularly 0.04 to 0.1.

(11) Rheovibron

Using a dynamic viscoelastometer (Rheovibron manufactured by Toyo Baldwin Co., Ltd.), the video tape was measured for viscoelasticity at a frequency of 110 Hz. Tg is defined as the peak temperature of E". In this testing method, a vibration was applied to the tape from one end, and the vibration transmitted to the other end was measured.

As a result, Tg was 73° C., E' (50° C.) was $4\times10^{10}$ dyne/cm$^2$, and E" (50° C.) was $1\times10^{11}$. It was found that the practical Tg is preferably in the range of 40 to 120° C. particularly 50° to 110° C. It was also found that the practical E' (50° C.) is preferably in the range of $0.8\times10^{11}$ to $11\times10^{11}$ dyne/cm$^2$, particularly $1\times10^{11}$ to $9\times10^{11}$ dyne/cm$^2$. It was further found that the practical E" (50° C.) is preferably in the range of $0.5\times10^{11}$ to $8\times10^{11}$ dyne/cm$^2$, particularly $0.7\times10^{11}$ to $5\times10^{11}$ dyne/cm$^2$.

(12) Adhesive strength

The adhesive strength between the support and the magnetic layer was measured by 180° peeling method.

A 8-mm wide test specimen slit from the video tape was put onto an adhesive tape manufactured by 3M Corporation and then measured for 180° peel strength at 23° C. and 70% RH.

The result was 50 g. It was found that the practical adhesive strength is preferably in the range of 10 g or more, particularly 20 g or more.

(13) Abrasion

The surface of the magnetic layer was measured for ball abrasion at 23° C. and 70% RH.

The specimen was fixed onto a preparation glass at its both ends with an adhesive tape. A 6.25-mm $\phi$ steel ball was allowed to slide on the specimen with a load of 50 g applied thereto. Specifically, the steel ball travelled once through a distance of 20 mm at a speed of 20 mm/sec. The ball steel was then moved to another test surface. The same experiment was repeated 20 times. The surface thus tested was then observed under microscope at ×40 magnification. Assuming that the surface is circle, its diameter was determined. From the diameter, abrasion was calculated.

The result was $0.7\times10^{-5}$ to $1.1\times10^{-5}$ m$^3$. It was found that the practical abrasion is preferably in the range of $0.4\times10^{-5}$ to $5\times10^{-5}$ m$^3$, particularly $0.4\times10^{-5}$ to $2\times10^{-5}$ m$^3$.

(14) SEM (scanning electron microscope)

The magnetic layer was observed for surface conditions under scanning electron microscope.

The magnetic layer was photographed under an electron microscope S-900 manufactured by Hitachi Ltd. at a ×5,000 magnification. Five copies of the photograph were obtained. On these copies, abrasives on the surface of the magnetic layer were measured.

The number of abrasive grains was 0.2/$\mu$m$^2$. It was found that the practical number of abrasive grains is preferably in the range of 0.1/$\mu$m$^2$ or more, particularly 0.12/$\mu$m$^2$ to 0.5/$\mu$m$^2$.

(15) GC (gas chromatography)

The amount of residual solvents in the magnetic tape was determined by gas chromatography.

Using a gas chromatography GC-14A manufactured by Shimadzu Seisakusho Ltd., a 20-cm$^2$ specimen was heated to a temperature of 120° C. for the measurement of the amount of residual solvents in the magnetic recording medium.

The amount of residual solvents was 8 mg/m$^2$. It was found that the practical amount of residual solvents is preferably in the range of 50 mg/m$^2$ or less, particularly 20 mg/m$^2$ or less.

(16) Sol fraction

The ratio of soluble content extracted from the magnetic layer in the magnetic tape with THF to the weight of the magnetic layer was determined. As a result, the sol fraction was 7%. It was found that the practical sol fraction is preferably in the range of 15% or less, particularly 10% or less.

The 8-mm video tapes thus obtained were compared with commercially available video tapes. The results are set forth in Table 5.

TABLE 5

| | Present invention | | Commercial tape | |
|---|---|---|---|---|
| | Specimen 1 PET support | Specimen 2 PEN support | (1) Metal single layer tape | (2) Metallized tape |
| Electro-magnetic characteristics | | | | |
| 7 MHz output (dB) | 5.5 | 6.0 | 3.0 | 6.2 |
| C/N (dB) | 4.3 | 4.5 | 2.0 | 4.1 |
| Color S/N (dB) | 2.5 | 2.6 | 2.5 | −3.0 |
| Video S/N (dB) | 2.1 | 2.3 | 1.5 | 0.5 |
| Durability | | | | |
| Dropout | 40 | 30 | 30 | 580 |
| BER ($\times 10^{-5}$) | 4 | 2 | 50 | 80 |
| Jitter | E | E | E | P |
| Still | 30 min. or more | 30 min. or more | 30 min. or more | 30 min. or more |
| Head abrasion (3) | 1.2 | 1.4 | 2.0 | 0.2 |
| Storage stability (4) | E | E | E | P |
| Running durability | E | E | E | P |
| Scratch | E | E | E | FP |

(1) Make: Fuji Photo Film Co., Ltd. (Lot No. 407209M)
(2) Make: Sony Corp. (Lot No. 709011CD)
(3) Unit: μm/100 hr.
(4) Condition: 60° C., 90% RH These properties were evaluated in accordance with the above mentioned methods or general methods.
The criteria are as follows:
Jitter:

E . . . less than 0.2 μ sec.

P . . . 0.2 μ sec. or more
Storage stability:

E . . . No rust on the surface after storage at 60° C., 90% for 2 weeks

P . . . Rust on the surface after storage at 60° C., 90% for 2 weeks

Running durability: 120-minute reproduction was repeated in a 8-mm cassette 100 times E . . . No clogging that lasts 5 min. or more P . . . Clogging after 100 repeats Scratch: 10 minute running was conducted in still mode E . . . No scratches visually observed P . . . Scratches visually observed In the present invention, the amount of a lubricant incorporated into a coating type magnetic recording medium comprising a magnetic layer having a thickness of 1.0 μm or less can be properly controlled. Further, since the dispersibility of the inorganic powder in the lower nonmagnetic layer can be enhanced, the surface properties of the magnetic layer can be improved, while controlling the disorder of the interface between the upper layer and the lower layer to secure uniformity in the magnetic layer. Moreover, the maximum effects can be obtained by the use of the required lowest amount of an aliphatic acid as a lubricant. Accordingly, a magnetic recording medium can be provided which can secure running properties with reduced jitter, provide improvements in durability and preservability of the coat film, and exhibit electromagnetic characteristics comparable with that of metal thin film type magnetic recording media.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:

(1) a nonmagnetic support;

(2) a lower nonmagnetic layer coated on the support, which comprises an inorganic nonmagnetic powder which powder is dispersed in a binder and which powder is surface-coated with an inorganic oxide; and (3) an upper magnetic layer coated on the lower nonmagnetic layer and comprising a dispersion of a ferromagnetic powder in a binder, wherein the lower nonmagnetic layer has a thickness of 0.5 μm to 10 μm after drying and the upper magnetic layer has a thickness of 1.0 μm or less after drying.

2. The magnetic recording medium as in claim 1, wherein the inorganic oxide is at least one member selected from the group consisting of $Al_2O_3$ in an amount of about 1 to 21% by weight, $SiO_2$ in an amount of about 0.04 to 20% by weight, and $ZrO_2$ in an amount of about 0.05 to 15% by weight; based on the total weight of the inorganic nonmagnetic powder.

3. The magnetic recording medium as in claim 1, wherein the inorganic nonmagnetic powder is a metallic oxide.

4. The magnetic recording medium as in claim 1, wherein the inorganic nonmagnetic powder is rutile titanium dioxide coated with an inorganic oxide in an amount of about 5 to 30% by weight.

5. The magnetic recording medium as in claim 1, wherein the lower nonmagnetic layer comprises a nonmagnetic powder coated with an inorganic oxide in an amount of about 51 to 99.8% by weight of all inorganic powder.

6. The magnetic recording medium as in claim 1, wherein a solvent is used in the lower nonmagnetic layer and upper magnetic layer which contains a compound having a solubility parameter of 8 to 11 and a di-electric constant of 15 or more at 20° C. in an amount of 15% by weight or more.

7. The magnetic recording medium as in claim 1, wherein the binder used in the lower nonmagnetic layer and upper magnetic layer contains at least one polar group selected from the group consisting of —COOM, —OSO$_3$M, —SO$_3$M, —PO(OM$_1$)(OM$_2$), —OPO(OM$_1$)(OM$_2$), and —NR$_4$X, wherein M, M$_1$ and M$_2$ each represents Li, Na, K, H, —NR$_4$ or NHR$_3$; R represents an alkyl group or a hydrogen atom; and X represents a halogen atom.

8. The magnetic recording medium as in claim 1, wherein the lower nonmagnetic layer has a volumetric ratio of binder to inorganic nonmagnetic powder of about 2.0 to 0.3, and the upper magnetic layer has a volumetric ratio of binder to the ferromagnetic powder of about 0.5 to 1.8.

9. The magnetic recording medium as in claim 1, wherein the lower nonmagnetic layer further contains an aliphatic acid and an organic compound, other than said aliphatic acid, that is capable of being adsorbed by or reacting with said inorganic nonmagnetic powder.

10. The magnetic recording medium as in claim 9, wherein the inorganic nonmagnetic oxide is a metallic oxide and the organic compound is at least one surface treatment agent selected from the group consisting of an organic acid having pKa of 3 or less, an epoxy group-containing compound having a molecular weight of 3,000 or less, a silane coupling agent, and a titanate coupling agent.

11. The magnetic recording medium as in claim 9, wherein the lower nonmagnetic layer and upper magnetic layer contain an aliphatic acid in an amount of 2.0% by weight or less based on the total weight of the upper magnetic layer and the lower nonmagnetic layer, and wherein the amount of aliphatic acid extractable with n-hexane is 50% by weight or more.

12. The magnetic recording medium as in claim 1, wherein the upper magnetic layer is coated onto the lower nonmagnetic layer while the lower nonmagnetic layer is wet.

13. The magnetic recording medium as in claim 1, wherein the inorganic oxide is at least one member selected from the group consisting of Al$_2$O$_3$, SiO$_2$, ZrO$_2$, SnO$_2$, Sb$_2$O$_3$ and ZnO.

14. The magnetic recording medium as in claim 1, wherein the inorganic nonmagnetic powder is a member selected from the group consisting of titanium dioxide, barium sulfate, zinc oxide, α-iron oxide, getite and CeO$_2$.

* * * * *